US012581019B2

(12) United States Patent
Dodo et al.

(10) Patent No.: US 12,581,019 B2
(45) Date of Patent: Mar. 17, 2026

(54) SYSTEMS AND METHODS FOR QUERYING DATABASES OF CLAIMS

(71) Applicant: MOLAR SOLUTIONS, INC., New York, NY (US)

(72) Inventors: Rafael E. Dodo, New York, NY (US); Rabi Alam, New York, NY (US); Tyler Hicks-Wright, New York, NY (US); Jonathon Ditroia, New York, NY (US); Giovanni Vocale, New York, NY (US)

(73) Assignee: Molar Solutions, Inc., New York, NY (US)

( * ) Notice: Subject to any disclaimer, the term of this patent is extended or adjusted under 35 U.S.C. 154(b) by 0 days.

(21) Appl. No.: 18/917,705

(22) Filed: Oct. 16, 2024

(65) Prior Publication Data

US 2025/0124033 A1 Apr. 17, 2025

Related U.S. Application Data

(60) Provisional application No. 63/544,537, filed on Oct. 17, 2023, provisional application No. 63/544,532, filed on Oct. 17, 2023, provisional application No. 63/544,522, filed on Oct. 17, 2023.

(51) Int. Cl.

| | |
|---|---|
| *G06F 16/95* | (2019.01) |
| *G06F 16/23* | (2019.01) |
| *G06F 16/2453* | (2019.01) |
| *G06F 16/9535* | (2019.01) |
| *G06F 16/9538* | (2019.01) |
| *H04L 51/04* | (2022.01) |
| *H04N 1/00* | (2006.01) |

(52) U.S. Cl.
CPC ..... *H04N 1/00095* (2013.01); *G06F 16/2379* (2019.01); *G06F 16/24542* (2019.01); *G06F 16/9535* (2019.01); *G06F 16/9538* (2019.01); *H04L 51/04* (2013.01)

(58) Field of Classification Search
None
See application file for complete search history.

(56) References Cited

U.S. PATENT DOCUMENTS

| | | | | |
|---|---|---|---|---|
| 7,734,483 | B1 | 6/2010 | Smith et al. | |
| 9,686,263 | B2 * | 6/2017 | Wise | G06F 3/0482 |
| 10,915,968 | B1 * | 2/2021 | Berger | G06Q 40/12 |
| 10,977,379 | B1 * | 4/2021 | Williams | G06F 21/604 |
| 11,050,716 | B1 * | 6/2021 | de Hoz Diego | H04L 63/0263 |
| 11,269,889 | B1 * | 3/2022 | Aversano | G06F 16/2458 |

(Continued)

*Primary Examiner* — Eliyah S. Harper
(74) *Attorney, Agent, or Firm* — Foley & Lardner LLP

(57) ABSTRACT

Presented herein are systems and methods for aggregating claims data. A database query service may aggregate record data from clients, provider services, and a multitude of other entities to store and maintain on a centralized database. The records data may be stored and maintained as one or more data structures in accordance with a standard template across the database to facilitate access by the entities using the database. The records data may also identify information for entities. The service may also establish a communication session to facilitate exchange of messages through an interface between a client device and provider services. The service may monitor for usage of an electronic device at the provider service.

20 Claims, 11 Drawing Sheets

(56)      References Cited

U.S. PATENT DOCUMENTS

| 11,720,566 | B2 * | 8/2023 | Enayet | G06F 16/178 |
| | | | | 707/769 |
| 2007/0168228 | A1 | 7/2007 | Lawless | |
| 2010/0082497 | A1 * | 4/2010 | Biesemann | G06Q 10/103 |
| | | | | 705/301 |
| 2011/0191250 | A1 * | 8/2011 | Bishop | G06Q 20/382 |
| | | | | 705/67 |
| 2014/0257837 | A1 * | 9/2014 | Walker | G16H 20/10 |
| | | | | 705/2 |
| 2016/0055504 | A1 * | 2/2016 | Murray | G06T 13/80 |
| | | | | 705/7.33 |
| 2017/0235848 | A1 * | 8/2017 | Van Dusen | G06Q 30/0201 |
| | | | | 705/12 |
| 2020/0035341 | A1 * | 1/2020 | Kain | G06N 20/00 |
| 2022/0292100 | A1 * | 9/2022 | Schouten | G06F 16/2358 |
| 2022/0292543 | A1 * | 9/2022 | Henderson | G06Q 30/0252 |
| 2022/0399093 | A1 * | 12/2022 | Stong | G06F 3/0482 |
| 2022/0407861 | A1 * | 12/2022 | Beecham | H04L 63/08 |
| 2023/0058870 | A1 * | 2/2023 | Huang | G06F 16/2453 |
| 2023/0385271 | A1 * | 11/2023 | Bensberg | G06F 16/2379 |
| 2024/0104101 | A1 * | 3/2024 | Batchu | G06F 16/24564 |
| 2024/0177211 | A1 | 5/2024 | Balasubramanian et al. | |
| 2024/0404675 | A1 | 12/2024 | Bogaerts et al. | |
| 2025/0124033 | A1 * | 4/2025 | Dodo | H04N 1/00095 |

* cited by examiner

600

Sort/Filter function

New prescription
pop-up

Intuitive opportunity
review (best, high
savings, Etc.)

Hovering feature
for more detail on
recommendation

Options to review &
accept or cancel
selections

650

Detailed status updates in a secure messaging environment

In-chat clinical interactions

Embedded features

Tracker for savings opportunities that have been previously actioned

Bi-Directional Communication HIPAA-compliant text-messages

SYSTEMS AND METHODS FOR QUERYING DATABASES OF CLAIMS

CROSS REFERENCES TO RELATED APPLICATIONS

The present application claims the benefit of and priority to U.S. Provisional Patent Application Nos. 63/544,522, 63/544,532, and 63/544,537, titled "Systems and Methods for Querying Databases of Claims," each filed Oct. 17, 2024, each of which is incorporated by reference in its entirety.

TECHNICAL FIELD

This application generally relates to querying databases. In particular, the present application relates to querying databases of records data to extract information.

BACKGROUND

Electronic records containing data (e.g., claims-related data) may be stored and maintained across a multitude of databases. The data in the records may include information on computing devices and services communicating with one another (e.g., indicating patients receiving healthcare services or prescriptions). It may be difficult to store and maintain electronic records on databases. First, the sheer volume of data may be massive, with electronic records containing a wide variety of facets of information related to the patient in receiving care from different healthcare providers and prescriptions from various pharmacies. Second, the records data themselves may be tracked by different entities (e.g., care providers, insurers, and pharmacies) on separate databases with little to no direct integration (e.g., no communication or standard format) with one another.

These and other factors may lead to barriers to accessing such data across different entities as well as incomplete and inconsistent entries in the records data, making it difficult to access and query the records data. As a consequence, there may result in time and effort spent by various entities maintaining the records data on their databases. This may lead to significant degradation in the delivery of care and prescriptions to patients, especially in consideration that certain medications are not to be taken with one another due to harm from potential side effects to patient. In addition, this convoluted and patchwork setup may cause wasted computer resources and network bandwidth from attempting to access and query for records data stored across different databases.

SUMMARY

To address these and other technical challenges, a database query service may aggregate records data from various client devices and services (e.g., patients, care providers, pharmacy services), and a multitude of other entities to store and maintain on a centralized database. The records data may be stored and maintained as one or more data structures in accordance with a standard template across the database to facilitate access by the entities using the database. The records data may also identify information for instructions from other services (e.g., prescriptions from care provider or pharmacy services) available for provision for various conditions (e.g., to address health conditions of patients). For instance, the records data may represent available inventory of drugs for patients at a particular pharmacy service or location, as an alternative substitute for drugs prescribed for a particular patient. The records data may identify an available instruction aimed associated with a particular condition; a value at which to perform an operation to receive the instruction and a service from which to obtain the instruction.

In conjunction with the aggregation of more records data onto the database, the service may receive a query for records data for a client device (e.g., associated with an end-user or patient) to find alternative records data. The query may identify the record initially assigned to the client device and may identify: an instruction originally designated for the client device associated with a condition (e.g., aimed at addressing the patient's condition); a value at which to perform an operation (e.g., transaction) for the instruction; and a provider service from which to obtain the instruction. Upon receipt, the service may search the database for candidate records data with correspondence with the records data of the query. The correspondence may be defined in accordance with a rule (e.g., for therapeutic equivalence or generic relation). For example, the candidate records data found may identify instructions that are associated with the same condition (e.g., directed to addressing the same health condition or may be a generic version of the drug identified in the query). With the identification, the service may select one of the candidate records data as an alternate record to provide to the end user. The alternate record may have a value less than the originally assigned value as identified in the record of the query.

Upon selection, the service may return a response identifying the selected, alternate record to the client device for presentation through an application on the client device. The user of the client device may be presented with an option to accept or reject the alternative record. If the end-user indicates rejection of the alternative record, the service may continue to monitor for alternative records data, as more and more records data are aggregated onto the database. Otherwise, if the end-user indicates acceptance, the service may proceed with using the alternative record data to generate information for an electronic device (e.g., electronic or virtual card) to be used for the operation to receive the substitute instruction. Once generated, the service may provide the electronic information to the client device for use to receive the instruction through the provider service identified in the alternative record.

In connection with the query, the service may establish a communication session to facilitate exchange of messages through an interface between the client device or other associated client devices operating on behalf of the end-user (e.g., family members, the service described herein, other care or service providers) and other involved provider services (e.g., a care provider or a pharmacy service). The service may deliver the alternative record data using a message object for the messaging interface on the end-user device. The service may also provide indications of modifications to instructions for the end-user through the messaging interface. The message object may specify field-value pairs for information about the alternative record data to be presented through user interface elements on the interface. At least some of the user interface elements may be rich content to allow the end-user to expand and input data for queries and other submissions to entities in the communication session. For example, when the patient accepts the alternative claims identified in the records data, the service may generate a message (e.g., an e-fax) by populating the input into a template for the message, and the service or the end-user (or another entity on behalf of the end-user) may send the message to the care provider to approve the substitute instruction.

In addition, the service may monitor for usage of the electronic device at a provider service (e.g., a pharmacy service) for the operation to receive the substitute instruction at the value identified in the alternate record. When detected (e.g., use of the card at a position of sale (POS) device or an online transaction portal), the provider service may validate whether the electronic device is used at the provider service identified by the alternate record. If successfully validated, the service may identify a rule configured by the end-user for the application of the value across accounts associated with the end user. The rule may specify a sequence to apply the value across the accounts and maximum for withdrawal from each account. With the identification, the service may select the accounts and apply the value to the accounts as specified by the rule. The service may determine a difference in the values between the original record and the alternate record to provide for presentation to the end-user.

In this manner, the database query service may provide for centralized management of records data aggregated at the database to facilitate relatively easy access and query functions for alternative records data. The service may also facilitate for messaging in connection with the query across involved client device and other services (e.g., the patient, care provider, and the pharmacy), which otherwise would have lacked integrated communication channels. As a result, time and effort that would have been consumed in searching for the entirety of the records data may now be drastically reduced. In addition, the database query service may decrease consumption of computing resources from redundant and duplicative storage of records data and improve quality and integrity of records data by specifying a standardized formatting for data maintained on the database. By providing the messaging interface, the service may increase the quality of human-computer interaction (HCl) in querying the database for records data.

Aspects of the present disclosure are directed to systems, methods, and non-transitory computer readable media for querying databases for switching records. A server may receive, from a client of a user, a first record indicating (i) an instruction to be taken to address a condition, (ii) a first value for a receipt of the instruction, and (iii) a first service of a plurality of services through which the instruction is to be received. The server may obtain, for storage on a database, a plurality of second records from the plurality of services, each of the plurality of second records indicating (i) the instruction to be taken, (ii) a respective second value for receipt of the instruction, and (iii) a corresponding second service of the plurality of services through which the instruction to be received. The server may identify, from the database, a second record indicating the second value relative to the first value, from applying a machine learning engine on the first record and the plurality of second records. The server may detect an occurrence of a triggering condition associated with a likelihood of the user to accept switching of the first record with the second record. The server may transmit, responsive to detecting the occurrence of the triggering condition, a notification message to the client for presentation on a user interface to prompt the user to accept or reject the second record instead of the first record.

In one embodiment, the server may receive, from the client, an indication of an acceptance of the second record via the user interface. The server may update, on the database, a user account associated with the user to switch assignment from the first record to the second record. In another embodiment, the server may transmit, responsive to the indication of the acceptance, a second notification message to the second service to prompt for acceptance or rejection of the second record. The server may receive, from the second service, a second indication of acceptance of the second record. The server may generate information for an electronic device to be used by the user to receive the instruction through the second service at the second value.

In yet another embodiment, the server may receive, from the client, an indication of a rejection of the second record via the user interface. The server may continue to monitor the database for a third record from the plurality of second records from the plurality of services to switch the first record, responsive to the indication of the rejection.

In yet another embodiment, the machine learning engine may identify, from the plurality of second records, the second record having one or more correspondences with the first record. In yet another embodiment, the one or more correspondences includes at least one of a therapeutic correspondence or a generic correspondence between the instruction identified in the first record and the instruction identified in the second record.

In yet another embodiment, the machine learning engine may use a machine learning model to select the second record from the plurality of second records based on the first record. In yet another embodiment, the machine learning model is trained according to a training dataset comprising a plurality of examples each identifying (i) a sample record to be switched and (ii) a sample candidate record to switch with the sample record.

Aspects of the present disclosure are directed to systems, methods, and non-transitory computer readable media for dynamically updating chat message interfaces for database queries. A server may obtain for storage on a database, a plurality of records from the plurality of services. Each of the plurality of records may indicate (i) the instruction to be taken, (ii) a respective value for receipt of the instruction, and (iii) a corresponding service of the plurality of services through which the instruction to be received. The server may identify, from the database, a record indicating a first value relative to a second value initially assigned to a user, from applying a machine learning engine on the plurality of records. The server may transmit a message object for presentation via a chat messaging interface on a client of the user, the message object identifying the record for the instruction. The server may generate, responsive to an indication of acceptance of the record by the user via the chat messaging interface, a digital document to indicate switch to the record in accordance with an electronic facsimile format. The server may transmit the digital document to a care provider service via one or more communication channels including an electronic facsimile channel.

In one embodiment, the server may receive, from the care provider service, an indication of one of an approval or a rejection of the record. The server may transmit, responsive to receipt of the indication, a notification message identifying the indication for presentation via the chat messaging interface of the client. In another embodiment, the server may transmit, responsive to receipt of the indication of an approval of the record from a care provider service, a second message object to a service identified in the record. The server may receive an acknowledgment of receipt of the second record from a pharmacy identified by the second record.

In yet another embodiment, the server may initiate a chat session between the client and the service to exchange messages via the chat messaging interface, responsive to the acknowledgement of receipt of the second record. In yet another embodiment, the server may monitor, for a modification in the instruction assigned to the user via one or more data sources. The server may transmit, responsive to detecting the modification, a second message object for presentation via the chat messaging interface on the client of the user, the message identifying the modification in the instruction.

In yet another embodiment, the server may identify the message object from a message library comprising a plurality of message objects. Each of the plurality of message objects may define a respective plurality of user interface elements to be presented via the user interface. The server may generate the message object to indicate the record for the instruction identified using the recommendation engine. In yet another embodiment, the chat message interface may present a plurality of user interface elements. At least one of the plurality of user interface elements may include a rich content field for input.

Aspects of the present disclosure are directed to systems, methods, and non-transitory computer readable media for linking data sources. A server of an optimization computing network may receive, from a first service, a transaction data indicating a transaction to receive an instruction by a user at a value using an electronic device associated with the optimization platform. The server may select, from a plurality of records on a database, a record assigned to the user using the transaction data. The record may indicate a second service through which the instruction is received. The server may validate that the transaction is occurring at the first service corresponding to a second service identified in the record. The server may identify, responsive to validating, a user account of the user defining a rule for applying transaction values to one or more accounts linked with the electronic device. The server may determine, for each of the one or more accounts, a respective transaction value in accordance with the rule. The server may transmit, to a transactions processor associated with each of the one or more accounts, a request to transfer the respective transaction value from a corresponding account.

In one embodiment, the server may determine a difference value based upon (i) the transaction value identified in the record and (ii) a transaction value identified in a second record previously assigned to the user. The server may update, on the database, a user account associated with the user with an indication of the different value to apply for subsequent records of the user across the one or more accounts. In another embodiment, the server may transmit, to a client associated with the user, the difference value for presentation via the client.

In yet another embodiment, the server may determine to refrain from withdrawing from the one or more account linked to the electronic device of the user, responsive to failure to validate. In yet another embodiment, the rule defined in the user account identifies at least one of (i) a sequence in which to withdraw transaction values from the one or more accounts linked to the electronic device or (ii) a maximum value at which to withdraw from each of the one or more accounts.

In yet another embodiment, the electronic device may be issued by the optimization platform to perform the transaction for the record assigned to the user. In yet another embodiment, the server may receive, from an end-provider device associated with the service, the transaction data including an identification of the service.

Aspects of the present disclosure are directed to systems, methods, and non-transitory computer readable media for querying databases for switching records. A server may receive, from a client of a user, a first record indicating (i) an instruction to be taken to address a condition, (ii) a first value for a receipt of the instruction, and (iii) a first service of a plurality of services through which the instruction is to be received. The server may obtain, for storage on a database, a plurality of second records from the plurality of services, each of the plurality of second records indicating (i) the instruction to be taken, (ii) a respective second value for receipt of the instruction, and (iii) a corresponding second service of the plurality of services through which the instruction to be received. The server may identify, from the database, a second record indicating the second value relative to the first value, from applying a machine learning engine on the first record and the plurality of second records. The server may detect an occurrence of a triggering condition associated with a likelihood of the user to accept switching of the first record with the second record. The server may transmit, responsive to detecting the occurrence of the triggering condition, a notification message to the client for presentation on a user interface to prompt the user to accept or reject the second record instead of the first record.

In one embodiment, the server may receive, from the client, an indication of an acceptance of the second record via the user interface. The server may update, on the database, a user account associated with the user to switch assignment from the first record to the second record. In another embodiment, the server may transmit, responsive to the indication of the acceptance, a second notification message to the second service to prompt for acceptance or rejection of the second record. The server may receive, from the second service, a second indication of acceptance of the second record. The server may generate information for an electronic device to be used by the user to receive the instruction through the second service at the second value.

In yet another embodiment, the server may receive, from the client, an indication of a rejection of the second record via the user interface. The server may continue to monitor the database for a third record from the plurality of second records from the plurality of services to switch the first record, responsive to the indication of the rejection.

In yet another embodiment, the machine learning engine may identify, from the plurality of second records, the second record having one or more correspondences with the first record. In yet another embodiment, the one or more correspondences includes at least one of a therapeutic correspondence or a generic correspondence between the instruction identified in the first record and the instruction identified in the second record.

In yet another embodiment, the machine learning engine may use a machine learning model to select the second record from the plurality of second records based on the first record. In yet another embodiment, the machine learning model is trained according to a training dataset comprising a plurality of examples each identifying (i) a sample record to be switched and (ii) a sample candidate record to switch with the sample record.

Aspects of the present disclosure are directed to systems, methods, and non-transitory computer readable media for dynamically updating chat message interfaces for database queries. A server may obtain for storage on a database, a plurality of records from the plurality of services. Each of the plurality of records may indicate (i) the instruction to be taken, (ii) a respective value for receipt of the instruction, and (iii) a corresponding service of the plurality of services through which the instruction to be received. The server may identify, from the database, a record indicating a first value relative to a second value initially assigned to a user, from applying a machine learning engine on the plurality of records. The server may transmit a message object for presentation via a chat messaging interface on a client of the user, the message object identifying the record for the instruction. The server may generate, responsive to an indication of acceptance of the record by the user via the chat messaging interface, a digital document to indicate switch to the record in accordance with an electronic facsimile format. The server may transmit the digital document to a care provider service via one or more communication channels including an electronic facsimile channel.

In one embodiment, the server may receive, from the care provider service, an indication of one of an approval or a rejection of the record. The server may transmit, responsive to receipt of the indication, a notification message identifying the indication for presentation via the chat messaging interface of the client. In another embodiment, the server may transmit, responsive to receipt of the indication of an approval of the record from a care provider service, a second message object to a service identified in the record. The server may receive an acknowledgment of receipt of the second record from a pharmacy identified by the second record.

In yet another embodiment, the server may initiate a chat session between the client and the service to exchange messages via the chat messaging interface, responsive to the acknowledgement of receipt of the second record. In yet another embodiment, the server may monitor, for a modification in the instruction assigned to the user via one or more data sources. The server may transmit, responsive to detecting the modification, a second message object for presentation via the chat messaging interface on the client of the user, the message identifying the modification in the instruction.

In yet another embodiment, the server may identify the message object from a message library comprising a plurality of message objects. Each of the plurality of message objects may define a respective plurality of user interface elements to be presented via the user interface. The server may generate the message object to indicate the record for the instruction identified using the recommendation engine. In yet another embodiment, the chat message interface may present a plurality of user interface elements. At least one of the plurality of user interface elements may include a rich content field for input.

Aspects of the present disclosure are directed to systems, methods, and non-transitory computer readable media for linking data sources. A server of an optimization computing network may receive, from a first service, a transaction data indicating a transaction to receive an instruction by a user at a value using an electronic device associated with the optimization platform. The server may select, from a plurality of records on a database, a record assigned to the user using the transaction data. The record may indicate a second service through which the instruction is received. The server may validate that the transaction is occurring at the first service corresponding to a second service identified in the record. The server may identify, responsive to validating, a user account of the user defining a rule for applying transaction values to one or more accounts linked with the electronic device. The server may determine, for each of the one or more accounts, a respective transaction value in accordance with the rule. The server may transmit, to a transactions processor associated with each of the one or more accounts, a request to transfer the respective transaction value from a corresponding account.

In one embodiment, the server may determine a difference value based upon (i) the transaction value identified in the record and (ii) a transaction value identified in a second record previously assigned to the user. The server may update, on the database, a user account associated with the user with an indication of the different value to apply for subsequent records of the user across the one or more accounts. In another embodiment, the server may transmit, to a client associated with the user, the difference value for presentation via the client.

In yet another embodiment, the server may determine to refrain from withdrawing from the one or more account linked to the electronic device of the user, responsive to failure to validate. In yet another embodiment, the rule defined in the user account identifies at least one of (i) a sequence in which to withdraw transaction values from the one or more accounts linked to the electronic device or (ii) a maximum value at which to withdraw from each of the one or more accounts.

In yet another embodiment, the electronic device may be issued by the optimization platform to perform the transaction for the record assigned to the user. In yet another embodiment, the server may receive, from a point-of-sale (PoS) device associated with the service, the transaction data including an identification of the service.

Aspects of the present disclosure are directed to systems, methods, and non-transitory computer readable media for linking data sources. A server of an optimization computing network may receive, from a first service, operation data (e.g., transaction data) indicating an operation (e.g., transaction) to receive an instruction by a user at a value using an electronic device associated with the optimization platform. The server may select, from a plurality of records on a database, a record assigned to the user using the transaction data. The record may indicate a second service through which the instruction is received. The server may validate that the transaction is occurring at the first service corresponding to a second service identified in the record. The server may identify, responsive to validating, a user account of the user defining a rule for applying one or more operation values (e.g., transaction values) to one or more accounts linked with the electronic device. The server may determine, for each of the one or more accounts, a respective operation value (e.g., respective operation value) in accordance with the rule. The server may transmit, to an operation processor (which may be referred to as a transactions processor herein) associated with each of the one or more accounts, a request to transfer the respective transaction value from a corresponding account.

In one embodiment, the server may determine a difference value based upon (i) the transaction value identified in the record and (ii) the transaction value identified in a second record previously assigned to the user. The server may update, on the database, a user account associated with the user with an indication of the different value to apply for subsequent records of the user across the one or more accounts. In another embodiment, the server may transmit, to a client associated with the user, the difference value for presentation via the client.

In yet another embodiment, the server may determine to refrain from withdrawing from the one or more account linked to the electronic device of the user, responsive to failure to validate. In yet another embodiment, the rule defined in the user account identifies at least one of (i) a sequence in which to withdraw one or more transaction values from the one or more accounts linked to the electronic device or (ii) a maximum value at which to withdraw from each of the one or more accounts.

In yet another embodiment, the electronic device may be issued by the optimization platform to perform the transaction for the record assigned to the user. In yet another embodiment, the server may receive, from a point-of-sale (PoS) device associated with the service, the transaction data including an identification of the service.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification and illustrate embodiments of the subject matter disclosed herein.

DETAILED DESCRIPTION

Figure 1:
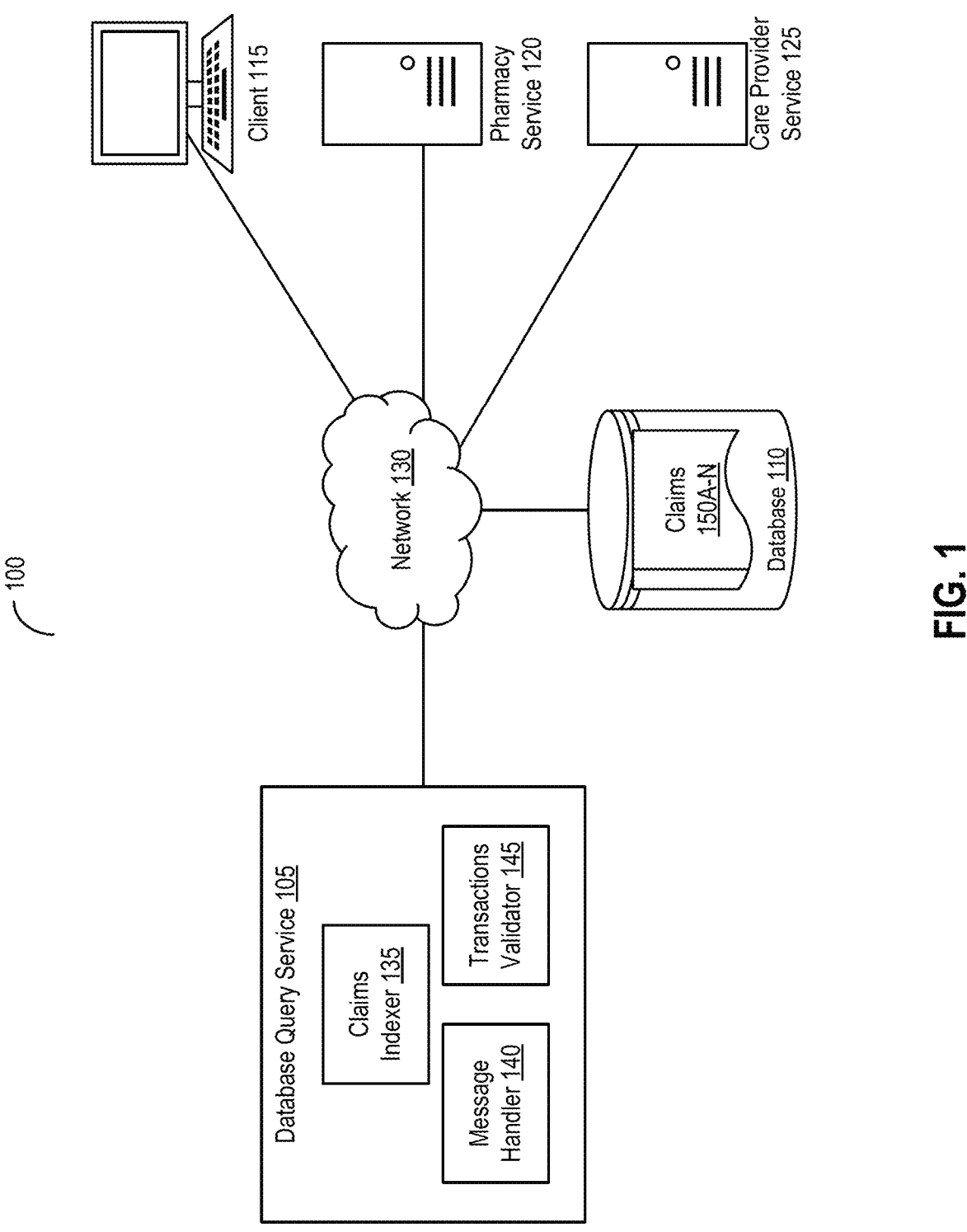
FIG. 1 depicts a block diagram of a system for handling claims data on databases, in accordance with an illustrative embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 depicts a block diagram of a system 100 for handling claims data on databases. In overview, the system 100 may include at least one database query service 105 (sometimes herein referred to generally as service or server), at least one database 110, at least one client 115, at least one pharmacy service 120, at least one care provider service 125, among others, communicatively coupled with one another via at least one network 130. The database query service 105 may include at least one claims indexer 135, at least one message handler 140, and at least one transactions validator 145, among others. The database may store, maintain, otherwise include a set of claims 150A-N (hereinafter generally referred to as claims 150). Each of the components described herein may be implemented using hardware or a combination of hardware and software (e.g., one or more processors coupled with memory to execute computer-readable instructions) for performing functionalities such as those detailed herein.

Embodiments may comprise additional or alternative components or omit certain components from those of FIG. 1 and still fall within the scope of this disclosure. Various hardware and software components of one or more public or private networks 130 may interconnect the various components of the system 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The data query service 105 may be any computing device including one or more processors coupled with memory with software capable of performing the various processes and tasks described herein. The data query service 105 may be associated with an entity managing the claims 150 on the database 110. Although shown as a single data query service 105, the data query service 105 may include any number of computing devices. The data query service 105 may be in communication with the client 115, the pharmacy service 120, and the care provider service 125 via the network 130. The data query service 105 may include several subsystems to perform the operations described herein. Executing on the data query service 105, the claims indexer 135 may maintain the claims 150 on the database 110 and handle queries for claims 150 in the database 110. The message handler 140 may facilitate communications among the client 115, the pharmacy service 120, and the care provider service 125 over the network 130 in relation to querying the claims 150 on the database 110. The transactions processor 145 may manage use of electronic cards in connection with claims 150 on the database 110.

The client 115 may be any computing device including one or more processors coupled with memory with software capable of performing the various processes and tasks described herein. The client 115 may be operated by or associated with a patient (sometimes herein referred to as a user, a member, or a subject), a caretaker of the patient, or any entity associated with the patient, among others. The client 115 may be in communication with the data query service 105, the pharmacy service 120, and the care provider service 125 via the network 130. The client 115 may be used by the patient to access the functionalities of the data query service 105. The client 115 may access the data query service 105 via an application (e.g., native application installed thereon or a web application accessible through a web browser).

The pharmacy service 120 may be any computing device including one or more processors coupled with memory with software capable of performing the various processes and tasks described herein. The pharmacy service 120 may be operated by or associated with a pharmacy entity, a physical location of a pharmacy, or a pharmacy supplier, among others. The client 115 may be in communication with the data query service 105, the client 115, and the care provider service 125 via the network 130. The pharmacy service 120 may generate and provide claims 150 to store and maintain on the database 110 based on available prescriptions. The entity associated with the pharmacy service 120 may provide the prescription identified in the claim 150 assigned to the patient.

The care provider service 125 may be any computing device including one or more processors coupled with memory with software capable of performing the various processes and tasks described herein. The care provider service 125 may be operated by or associated with a care provider, such as a clinician, a doctor, a dentist, a nurse, a physical therapist, a psychologist, or a pathologist, among others. The care provider service 125 may be in communication with the data query service 105, the client 115, and the pharmacy service 120, via the network 130. The care provider service 125 may approve the prescription identified in the claims 150 assigned to the patient associated with the client 115.

Figure 2:
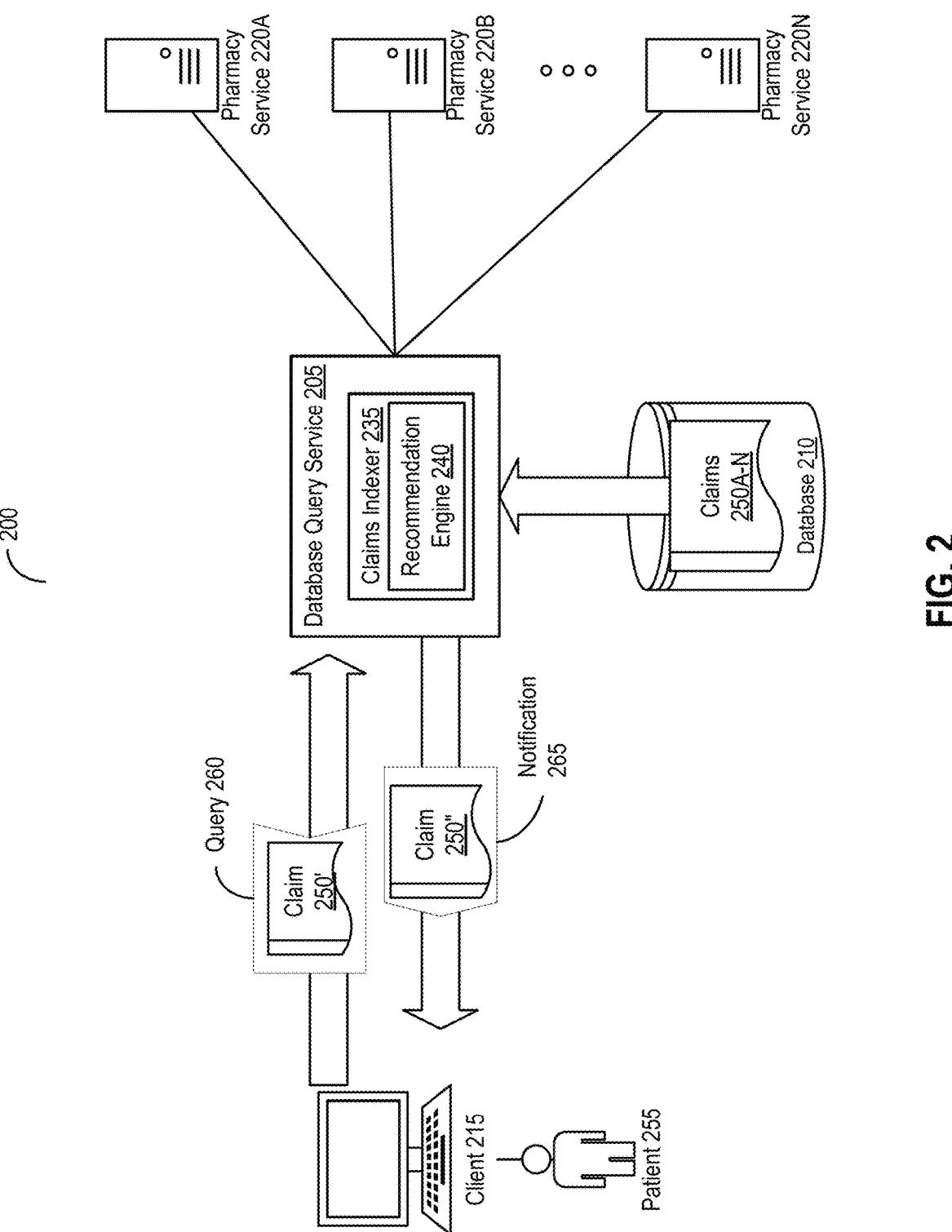
FIG. 2 depicts a block diagram of a system for query claims data on databases, in accordance with an illustrative embodiment.

FIG. 2 depicts a block diagram of a system 200 for query claims data on databases. In overview, the system 200 may include at least one database query service 205 including at least one claims indexer 235 including at least one recommendation engine 240, at least one database 210 storing and maintaining a set of claims 250A-N (hereinafter generally referred to as claims 250), at least one client 215 operated by or associated with at least one patient 255, and one or more pharmacy services 220A-N (hereinafter generally referred to as pharmacy service 220), among others. Embodiments may comprise additional or alternative components or omit certain components from those of FIG. 2 and still fall within the scope of this disclosure. Various hardware and software components of one or more public or private networks may interconnect the various components of the system 200. Each component in system 200 (such as the database query service 205, the client 215, and the pharmacy service 220) may be any computing device comprising one or more processors coupled with memory and software, and capable of performing the various processes and tasks described herein.

As used herein, a claim 250 refers to a data structure containing various types of data fields for initiating execution of a transaction. Each claim 250 may correspond to a prescription drug available for provision through the pharmacy service 220. The drug for a prescription (as indicated by the claim 250 data) may be used to address a medical condition, alleviate symptoms associated with such medical conditions, or prevent disease or illness, among others. The prescription data (in the claim 250 data) may be defined in terms of, for example, a type of medication, dosage, frequency, administration route, and duration, among others. Each claim 250 may include, identify, or indicate, for example, a corresponding prescription available for provision or distribution taken through the corresponding pharmacy service 220, a value (e.g., amount billed and any adjustments) associated with receipt of the prescription, and the pharmacy service 220 through which the prescription is to be provided, among others. In some embodiments, the claim 250 can identify or indicate whether the claim 250 itself (along with the prescription, the pharmacy service 220, and the value) is to be processed (e.g., in accordance with benefits structure, negotiated pricing, or discount to value) by a third-party entity, such as a health insurance entity or a benefits entity, among others. The claims 250 may be maintained as one or more machine-readable files in accordance with a standardized data format across different pharmacy services 220.

The claims indexer 235 executing on the database query service 205 store and maintains the set of claims 250 on the database 210. The claims indexer 235 may gather, collect, or otherwise aggregate the set of claims 250 from one or more pharmacy services 220. In some embodiments, the claims indexer 235 may use claims 250 from drug manufacturers and care providers to maintain the set of claims 250.

In conjunction, the client 215 may provide, transmit, or send at least one query 260 for the patient 255 to the database query service 205. The query 260 may include or identify at least one claim 250' for which an alternative or a substitute is to be identified. The claim 250' of the query 260 may be generated or populated by the patient 255 using a user interface presented via the application on the client 215. In some embodiments, another entity besides the client 215 may send the query 260. For instance, a care provider service, an insurance firm, or the pharmacy service 215 may send the query 260 on behalf of the patient 255. The claim 250' may include, identify, or indicate: a prescription initially assigned to be taken by the patient 255 to address a condition, a value (e.g., amount billed and any adjustments) associated with receipt of the prescription, and a pharmacy service 220 through which the patient 255 is to receive the prescription, among others.

The claims indexer 235 retrieves, identifies, or otherwise receives the query 260 for the patient 255. Upon receipt, the claims indexer 235 may parse the claim 250' to extract or identify: the prescription initially assigned to be taken by the patient 255, the value associated with receipt of the prescription, and the pharmacy service 220 through which the patient 255, among others. In some embodiments, the claim 250' of the query 260 can identify or indicate whether the claim 250' itself was processed by the third-party entity. The claims indexer 235 may identify additional information associated with the patient 255 or the claim 250' through other data sources. In some embodiments, the claims indexer 235 may store and maintain the claim 250' on the database 210.

With the receipt, the claims indexer 235 searches, identifies, or otherwise identifies one or more candidate claims from the set of claims 250 from the database 210. The candidate claims may correspond to a subset of claims 250 available for switching with claims from patients, including the claim 250' for the patient 255 identified in the query 260. Upon identification, the claims indexer 235 identifies or selects at least one claim 250" from the one or more candidate claims to assign or provide to the patient 255. The selection of the claim 250" may be based on the claim 250' identified in the query 260 (e.g., the prescription, the value, the identification of the pharmacy service 255, and an indication of whether the claim is processed by the third-party entity) and the additional information associated with the patient 255 or the claim 250' through other data sources. The selected claim 250" may identify a value lower than the value identified in the claim 250' of the query 260.

To select at least one claim 250" from the candidate claims to assign to the patient 255, the claims indexer 235 may maintain a set of rules. The set of rules may be defined, maintained, or otherwise configured on the recommendation engine 240. At least one rule may be to select based on a therapeutic correspondence between the prescription in the candidate claim and the prescription identified in the claim 250' of the query 260. In accordance with the rule on therapeutic correspondence, the claims indexer 235 may select the claim 250" from the candidate claims having a therapeutic correspondence with the claim 250' of the query 260. For example, the prescription in the claim 250" and the prescription identified in the claim 250' may both address the same medical condition. In some embodiments, the claims indexer 235 may call or invoke the recommendation engine 240 to select the claim 250" from the candidate claims having the therapeutic correspondence according to the set of rules configured on the recommendation engine 240.

Continuing on, at least another rule may be to select based on a generic correspondence between the prescription in the candidate claim and the prescription identified in the claim 250' of the query 260. In accordance with the rule on generic correspondence, the claims indexer 235 may select the claim 250" from the candidate claims having a generic correspondence with the claim 250' of the query 260. For instance, the prescription in the claim 250" may be genericized version of the prescription identified in the claim 250'. The claim 250" selected using the rules may identify a value lower than the initially assigned value identified in the claim 250' of the query 260. In some embodiments, the claims indexer 235 may call or invoke the recommendation engine 240 to select the claim 250" from the candidate claims having the generic correspondence according to the set of rules configured on the recommendation engine 240.

In some embodiments, the claims indexer 235 may initiate, train, or otherwise establish at least one machine learning (ML) model to select at least one claim 250" from the candidate claims to assign to the patient 255. The ML model may be of any architecture, such as regression model (e.g., linear or logistic), a decision tree, a random forest, a support vector machine (SVM), artificial neural network (ANN), a Naïve Bayes classifier, or a clustering algorithm, among others. The ML model may be configured or maintained on the recommendation engine 240. The ML model may be established or trained using a training dataset in accordance with supervised (e.g., for ANN) or unsupervised learning (e.g., for clustering algorithm). The training dataset may identify a number of examples. Each example may identify a sample claim to be switched with another claim and a set of sample candidate claims to switch with the sample claim. Both claims may include information in a similar format as the claims 250. With the establishment, the claims indexer 235 may apply the claim 250' of the query 260 into the ML model to output the selected model. In some embodiments, the claims indexer 235 may call or invoke the recommendation engine 240 to select the claim 250" from the candidate claims using the ML model configured on the recommendation engine 240

The claims indexer 235 may monitor for an occurrence of at least one triggering condition. The triggering condition may be associated with a likelihood of the user accept the switching from the initial claim 250' to the substitute claim 250". To monitor, the claims indexer 235 may aggregate, obtain, or otherwise retrieve data indicative of the user's acceptance of the switching from the initial claim 250' to the substitute claim 250". The data may identify or include, for example, the receipt of the query 260, a time to refill the prescription for the drug, and geolocation data on the patient 255 (e.g., relative to the pharmacy service 220 identified in the claim 250"), among others. Based on the data, the claims indexer 235 may calculate, generate, or otherwise determine the predicted likelihood that the user will accept the switch from the initial claim 250 to the claim 250". With the determination, the claims indexer 235 may compare the likelihood to a threshold. The threshold may delineate, specify, or otherwise define a value for the likelihood at which the trigger condition is determined to have occurred. If the likelihood satisfies (e.g., is greater than or equal to) the threshold, the claims indexer 235 may detect the occurrence of the triggering condition. On the other hand, if the likelihood does not satisfy (e.g., less than) the threshold, the claims indexer 235 may continue monitor for the occurrence of the triggering condition.

The claims indexer 235 returns, send, or otherwise transmits at least one notification message 265 to the client 215 (or a computing device associated with another entity). In some embodiments, the claims indexer 235 may transmit the notification message 265 to the client 215 responsive to detecting the triggering condition. The notification message 265 may include or identify the claim 250" selected to switch the claim 250' initially assigned to the patient 255 as identified in the query 260. The claim 250" may be provided for an electronic card (e.g., a virtual card) to be used by the patient 255 to receive the prescription from the pharmacy service 220 at the value as identified in the claim 250". The notification message 265 may be presented on a user interface on the client 215 to prompt the patient 255 (or user) to accept or reject the claim 250" instead of the initial claim 250'. Upon receipt, the client 215 may display, render, or otherwise present information based on the notification message 265.

With the transmission of the notification message 265, the claims indexer 235 may wait for an indication of acceptance or rejection of the claim 250" identified in the notification message 265 by the patient 255. When the indication of rejection is received from the client 215, the claims indexer 235 may continue to monitor the database 210 for new claims to switch from the initial claim 250'. When the indication of the acceptance is received, the claims indexer 235 may update an account associated with the patient 255 to switch assignment of the patient 255 from the original claim 250' to the new claims 250".

In some embodiments, upon acceptance by the client 215, the claims indexer 235 may also transmit another notification message to the pharmacy service 220 identified in the claim 250" to prompt for acceptance or rejection of the claim 250". If the indication of rejection is received from the pharmacy service 220, the claims indexer 235 may forward or provide the indication of the rejection to the client 215. The claims indexer 235 also may continue to monitor the database 210 for new claims to switch from the initial claim 250'. In contrast, when the indication of the acceptance is received, the claims indexer 235 may forward or provide the indication of the acceptance to the client 215. In addition, the claims indexer 235 may update account associated with the patient 255 to switch assignment of the patient 255 from the original claim 250' to the new claims 250".

In some embodiments, the claims indexer 235 may initially provide or transmit the claim 250" for the electronic card, upon acceptance of the claim 250 by the patient 255, the pharmacy 220 (e.g., identified in the claim 250"), or a care provider associated with the patient 255, among others. In some embodiments, the claims indexer 235 may generate the information for the electronic card to use for the claim 250″, upon identifying or detecting prior use of electronic cards by the patient 255. The information for the electronic card may include or identify the claim 250″ itself and information about the patient 255 (e.g., including insurance and account data), among others. In some embodiments, the client 215 may receive the electronic card information along with the claim 250″ from the database query service 205.

By performing the above functionalities, the database query service 205 can carry out a values-based rewards function. Under the values-based rewards function, the database query service 205 can handle the query 260 submitted by the patient 255 to search for substitute claims 250″ for the initially assigned claim 250′. Based on the information associated with the patient 255, the database query service 205 can identify a substitute claim 250″ to provide to the patient 255 to select for switching. Once switched from the initial claim 250′ to the new claim 250″, the patient 255 may be provided with a reward from selecting a lower value to use the pharmacy service 220 as identified in the substitute claim 250″. In this manner, the values-based rewards function carried by the database query service 205 can incentivize patients 255 to make use of the system.

Figure 3:
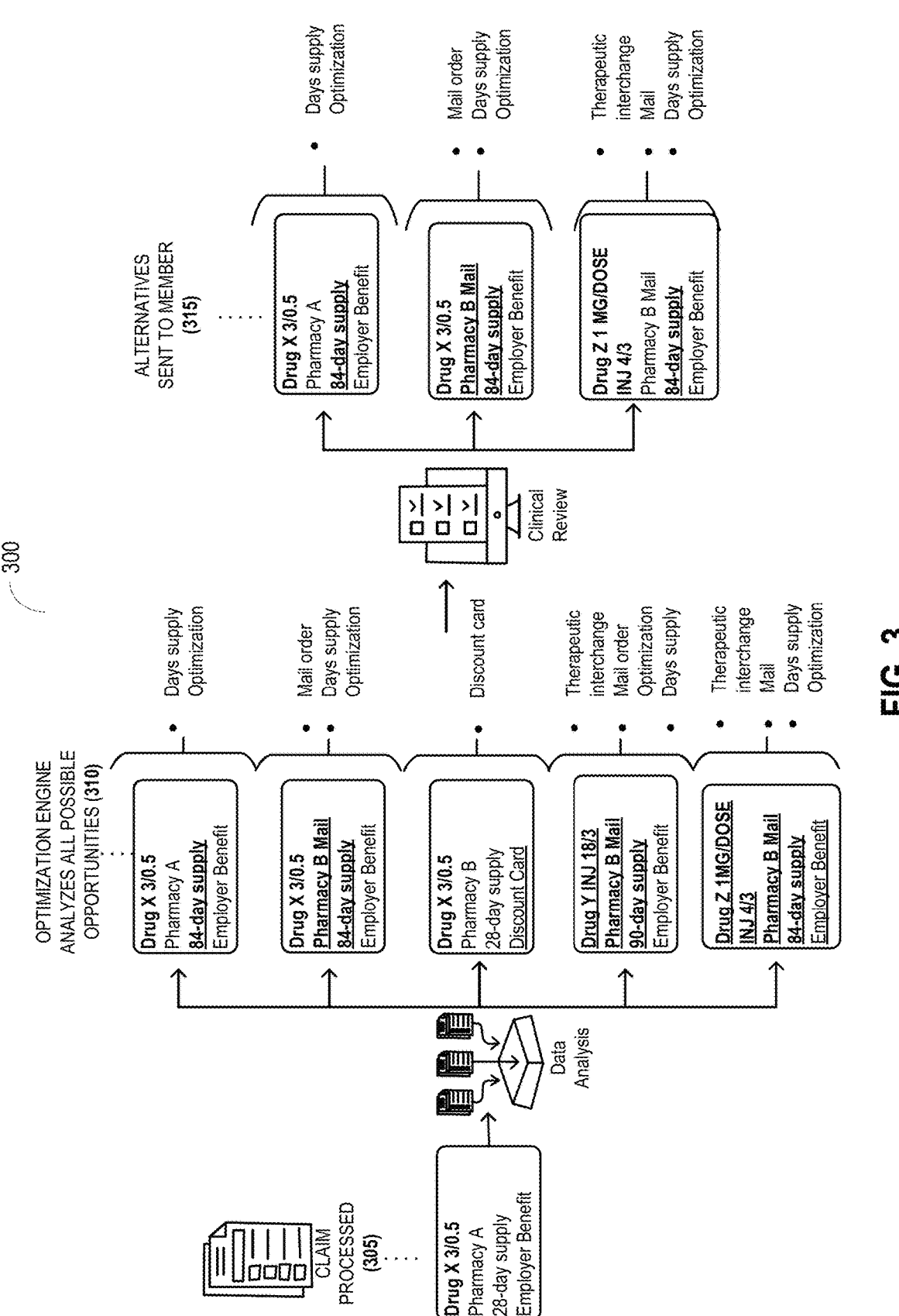
FIG. 3 depicts a block diagram of a process for finding alternative claims by querying on databases, in accordance with an illustrative embodiment.

FIG. 3 depicts a block diagram of a process 300 for finding alternative claims by querying on databases. The process 300 may be implemented or performed using any of the components detailed herein. Embodiments may include additional, fewer, or different operations from those described in the process 300. The process 300 may be performed by a server executing machine-readable software code, though it should be appreciated that the various operations may be performed by one or more computing devices and/or processors.

At step 305, a service may process claims submitted by a patient. In the depicted example, the service may receive the claims data identifying a drug "X" to be received from pharmacy "A" for 28 days and to be paid through an employer benefit. This claims data may be initially assigned to the patient. Upon receipt, the service may process the claims data to conform to a standardized format.

At step 310, the service may use an optimization engine to analyze candidate or possible claims data to replace the claim data originally assigned to the patient. The candidate claims data may be aggregated from various pharmacy services or drug manufacturers, and the candidate claims data may be maintained on a database. The selection of the alternate claims data may be based on an optimization of the day supply, the value for receipt of the prescription, and therapeutic or generic correspondence between the prescriptions. In accordance with the optimization, the service may select one of the candidate claims data as an alternate claims data to provide to the patient.

At step 315, the service may provide the alternative claims data to the patient. In providing, the service may first perform a clinical evaluation of the prescription in the alternative claim data. For example, the service may transmit the alternative claims data for approval by a care provider associated with the patient. Upon approval, the service may provide the one or more alternative claims to the patient.

Figure 4:
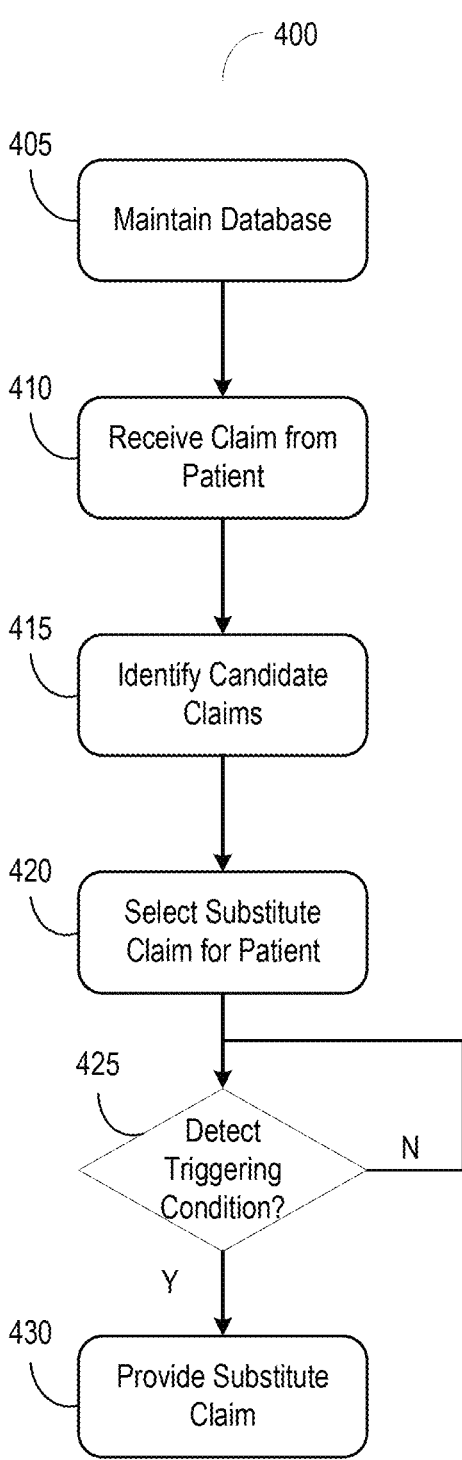
FIG. 4 depicts a flow diagram of a method of query claims data on databases, in accordance with an illustrative embodiment.

FIG. 4 depicts a flow diagram of a method 400 of query claims data on databases. The method 400 may be implemented or performed using any of the components detailed herein. Embodiments may include additional, fewer, or different operations from those described in the method 400.

The method 400 may be performed by a server executing machine-readable software code, though it should be appreciated that the various operations may be performed by one or more computing devices and/or processors. Under the method 400, at step 405, a service may maintain a database of claims. At step 410, the service may receive a claim from a patient. At step 415, the service may identify one or more candidate claims for the patient. At step 420, the service may select at least one substitute claim for the patient. At step 425, the service may detect whether there is an occurrence of a triggering condition. When there is no detection, the service may continue to monitor for the triggering condition. At step 430, when the occurrence of the triggering condition is detected, the service may provide the substitute claim to the patient.

Figure 5:
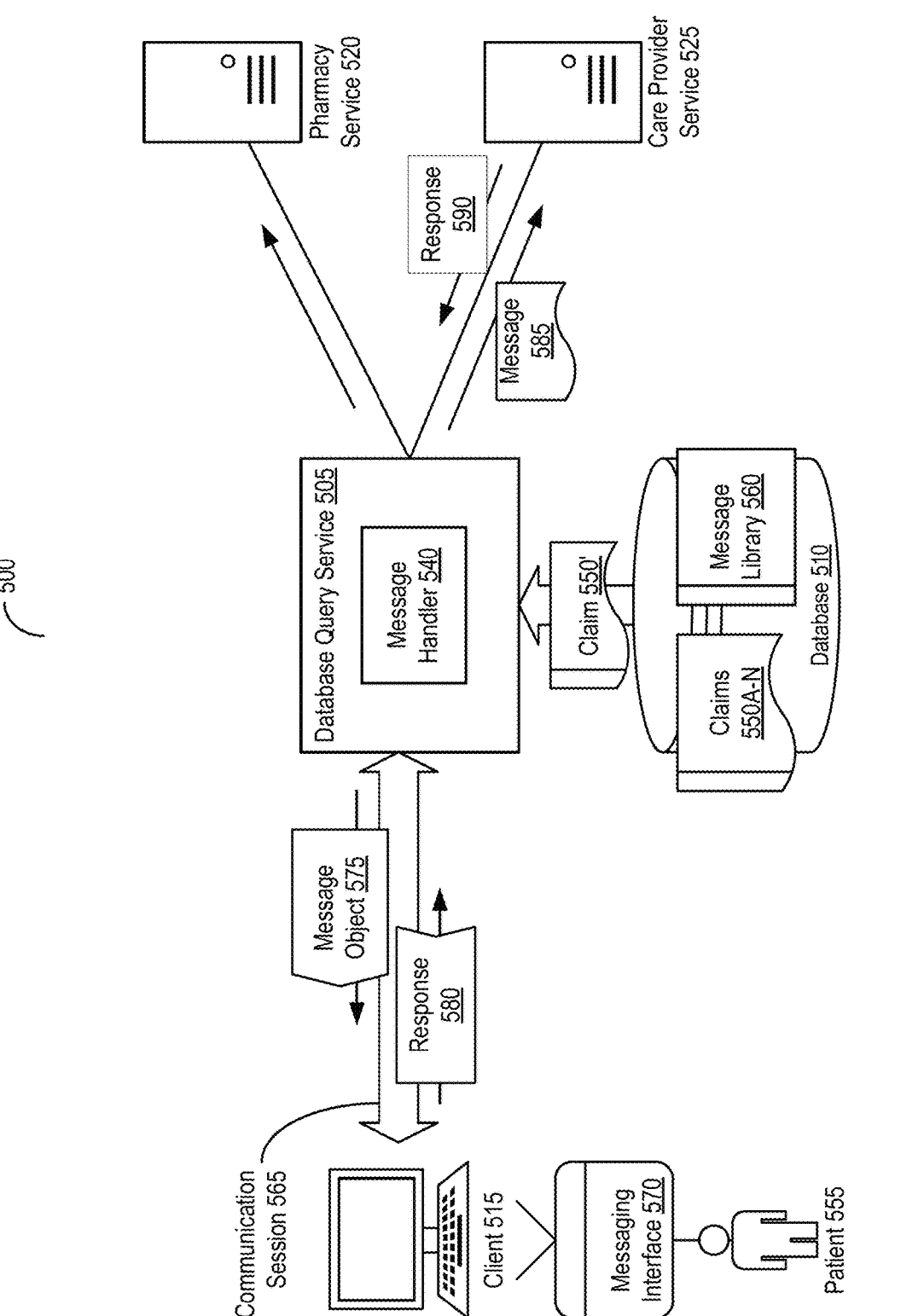
FIG. 5 depicts a block diagram of a system for messaging information for querying claims databases, in accordance with an illustrative embodiment.

FIG. 5 depicts a block diagram of a system 500 for messaging information for querying claims databases. In overview, the system 500 may include at least one database query service 505 including at least one message handler 540, at least one database 510 storing and maintaining a set of claims 550A-N (hereinafter generally referred to as claims 550) and a message library 560, at least one client 515 operated by or associated with at least one patient 555, at least one pharmacy service 520, and at least one care provider service 525, among others. Embodiments may comprise additional or alternative components or omit certain components from those of FIG. 5 and still fall within the scope of this disclosure. Various hardware and software components of one or more public or private networks may interconnect the various components of the system 500. Each component in system 500 (such as the database query service 505, the database 510, the client 515, the pharmacy service 520, and the care provider service 525) may be any computing device comprising one or more processors coupled with memory and software, and capable of performing the various processes and tasks described herein.

The message handler 540 executing on the database query service 505 may initiate and establish at least one communication session 565 with the client 515 (or a computing device of another associated entity). The communication session 565 may facilitate or may be used to present at least one messaging interface 570 on the client 515 for querying the database 510 for claims 550. For example, the patient 555 may use the messaging interface 570 to generate queries to send via the communication session 565 to search the database 510 for alternate claims 550′. The communication session 565 may provide for secure exchange of messages (e.g., a chat messaging interface) between the patient 555 on the client 515 and any one or more other entities, such as the pharmacy service 520, the care provider service 525, or an insurance firm, among others.

In conjunction, the message handler 540 retrieves, receives, or identifies a response to a query to switch from a claim 550 originally assigned to the patient 555 to at least one alternate claim 550′. The claim 550′ may be identified by a recommendation engine applied on the claims 550 of the database 510. In some embodiments, the message handler 540 may listen, wait, or otherwise monitor for the response to the query to switch the claims. The query may be from the patient 555 or another entity, such as the care provider or the insurer associated with the patient 555. Upon identification, the message handler 540 may parse the alternate claim 550′ to extract or identify: the prescription available to be taken by the patient 555, a value associated with receipt of the prescription, and the pharmacy service 520 through which the prescription is to be provided, among others.

With the identification, the message handler 540 may create, write, or generate at least one message object 575 using the claim 550'. The message object 575 may identify, specify, or otherwise define a set of field-value pairs to be presented via one or more user interface elements on the messaging interface 570. Each field-value pair may include a field identifying a type of information and a value identifying corresponding data assigned to the field. At least a portion of the field-value pairs may be generated from the information in the claim 550'. For instance, the message handler 540 may populate the values in the field-value pairs with the prescription information, the value, and the identification of the pharmacy service 520 as identified in the claim 550'. At least one of the user interface elements for presentation on the messaging interface 570 may accept, obtain, or otherwise receive user input when presented.

In some embodiments, the message handler 540 may identify or select the message object 575 to use to provide for the patient 555. The message handler 540 may store and maintain the message library 560 on the database 510. The message library 560 may include a set of available message objects from which to select to provide over the communication session 565 for presentation on the messaging interface 570. Each message object may identify, specify, or otherwise define a set of field-value pairs to be presented via one or more user interface elements on the messaging interface 570. In some embodiments, each message object may be associated with a corresponding trigger to select the corresponding message object for provision. In some embodiments, the message handler 540 may select or identify the message object 575 in response to detection of the trigger associated with the patient 555. For example, the trigger may include a detection of the response to a query of the database 510 or a modification in the prescription for the patient 555.

With the generation, the message handler 540 provides, send, or otherwise transmits the message object 575 via the communication session 565 for presentation of the set of field-value pairs on the one or more user interface elements of the messaging interface 570. At least one of the user interface elements identified in the message object 575 may be used to indicate one of an acceptance or rejection of the claim 550' for the patient 555. The user interface elements may include, for example, command buttons, text field, check boxes, radio buttons, sliders, icons, tabs, progress bars, sliders, among others to present the set of field-value pairs on the messaging interface 570. At least one of the user interface elements may include a rich content field (e.g., an image, icon to a file, an interactive graphic, or multimedia content). The rich content field may present and receive rich content on the messaging interface 570. The user interface elements may be embedded into an area within the messaging interface 570. For example, the user interface elements used to present the field-value pairs of the claims 550' may be within a defined area of a web application accessed through the client 515.

Upon receipt, the client 515 may listen or monitor for at least one user interaction with the user interface elements rendered, displayed, or otherwise presented on the messaging interface 570. The interaction may be with the user interface element to indicate acceptance or rejection of the claim 550' for the patient 555. The user interface elements for the field-value pairs for the claim 550' may be presented, rendered, or displayed adjacent to the user interface element for accepting or rejecting the claim 550'. Upon detection of the interaction, the client 515 may generate at least one response 580 (sometime referred herein as an input) to identify or indicate the acceptance or the rejection of the claim 550'. When the interaction is to indicate acceptance, the client 515 may generate the response 580 to indicate the acceptance of the claim 550'. When the interaction is to indicate rejection, the client 515 may generate the response 580 to indicate the rejection of the claim 550'. With the generation, the client 515 may return, send, or otherwise transmit the response 580 to the database query service 505 over the communication session 565.

The message handler 540 retrieves, identifies, or receives the response 580 from the client 565 over the communication session 565. With receipt, the message handler 540 may process or parse the response 580 to determine whether the indication is the acceptance or the rejection of the claim 550'. If the indication is to reject the claim 550', the message handler 540 may determine to refrain from assigning the alternate claim 550' to the patient 555. The message handler 540 may continue to monitor for responses to queries to switch from the initially assigned claim 550 to one or more alternate claims 550' from the database 510. On the other hand, if the indication is to accept, the message handler 540 may assign the alternate claim 550' to the patient 555.

When the response 580 includes the indication to accept the claim 550', the message handler 540 may create, write, or otherwise generate at least one notification message 585 to be provided to the care provider service 525. The notification message 585 may be generated in accordance with a template using the claim 550'. The template may define an arrangement of the information (e.g., field-value pairs for the claim 550') for presentation on the notification message 585. For example, the template may specify a sequence and placement of the field-value pairs for the claim 550' in an electronic fax message. Upon generation, the message handler 540 may provide, send, or otherwise transmit the notification message 585 to the care provider service 525.

The care provider service 525 retrieves, identifies, or otherwise receives the notification message 585 from the database query service 505. Upon receipt and presentation of the notification message 585, the care provider service 525 may listen or monitor for at least one user interaction. The interaction may be with the user interface element to indicate approval or denial of the claim 550' by a care provider associated with the patient 555. Upon detection of the interaction, the care provider service 525 may generate at least one response 590 (sometimes referred to as an input) to identify or indicate the approval or the denial of the claim 550'. When the interaction is to indicate approval, the care provider service 525 may generate the response 585 to indicate the approval of the claim 550'. When the interaction is to indicate denial, the care provider service 525 may generate the response 580 to indicate the denial of the claim 550'. With the generation, the care provider service 525 may return, send, or otherwise transmit the response 585 to the database query service 505.

The message handler 540 may in turn retrieve, identify, or receive the response 590 from the care provider service 525. In some embodiments, the message handler 540 may store and maintain the response 590 on the database 510. With receipt, the message handler 540 may process or parse the response 590 to determine whether the indication is the approval or the denial of the claim 550'. If the indication is to deny the claim 550', the message handler 540 may determine to refrain from assigning the alternate claim 550' to the patient 555. The message handler 540 may continue to monitor for responses to queries to switch from the initially assigned claim 550 to one or more alternate claims 550' from the database 510. On the other hand, if the indication is to accept, the message handler 540 may determine to confirm assignment of the alternate claim 550' to the patient 555.

In some embodiments, the messaging handler 540 may extend the communication session 565 with the client 515 to other entities, such as the pharmacy service 520 or the care provider service 525. When the indication is approval, the message handler 540 may send, provide, or otherwise transmit an indication of the approval to the pharmacy service 520. The indication message may be generated in accordance with a template using the claim 550'. The template may define an arrangement of the information (e.g., field-value pairs for the claim 550') for presentation on the indication message. Upon generation, the message handler 540 may provide, send, or otherwise transmit the indication message to the pharmacy service 520.

The pharmacy service 520 retrieves, identifies, or otherwise receives the indication message from the database query service 505. Upon receipt and presentation of the indication message, the pharmacy service 520 may listen or monitor for at least one user interaction. The interaction may be with the user interface element to indicate approval or denial of the claim 550' by a care provider associated with the patient 555. Upon detection of the interaction, the pharmacy service 520 may generate at least one response to indicate acknowledgment. With the generation, the pharmacy service 520 may return, send, or otherwise transmit the response to the database query service 505.

Upon receipt of the acknowledgment, the messaging handler 540 may extend the communication session 565 from the client 515 to the pharmacy service 520. With the extension, the communication session 565 may be used to exchange messages between the client 515 and the pharmacy service 520. The messages may be inputted and presented on the messaging interface 570 on the client 515. The pharmacy service 520 may also have an interface similar to the message interface 570 to enter and receive messages.

In some embodiments, the message handler 540 may monitor for a modification to the prescription identified in the claim 550' for the patient 555. The monitoring may be subsequent to approval from the care provider service 525 and acknowledgment by the pharmacy service 520. The message handler 540 may monitor any number of sources to detect the change, such as from the client 515, the insurance firm, the care provider 525, or the pharmacy service 520, among others. Upon detection, the message handler 540 may create, write, or otherwise generate a message object for the modification. The generation of the message object may be based on the prescription identified in the modification and at least a portion of the claim 550'. The message object may identify or include a set of field-value pairs to be presented as one or more user interface on the messaging interface 570. Upon generation, the message handler 540 may send, provide, or otherwise transmit the message object via the communication session 565 for presentation on the messaging interface 570.

The message handler 540 may present other message objects 575 for presentation via the messaging interface 570. In some embodiments, the message handler 540 may identify a set of claims 550 assigned to the patient 555 (e.g., initially assigned claims 550 or subsequently assigned alternate claims 550') from the database 510. Each of the claims 550 may identify at least one respective prescription to be taken by the patient 555. With the identification, the message handler 540 may send, provide, or otherwise transmit an identification of the set of claims 550 via the communication session 565. The set of claims 550 may be provided or presented as a set of corresponding user interface elements on the messaging interface 570. Each user interface element may identify a corresponding thread of messages within the communication session 565. For instance, each user interface element may allow for pop-up or expansion to display the text of the messages associated with a corresponding claim 550.

Figure 6A:
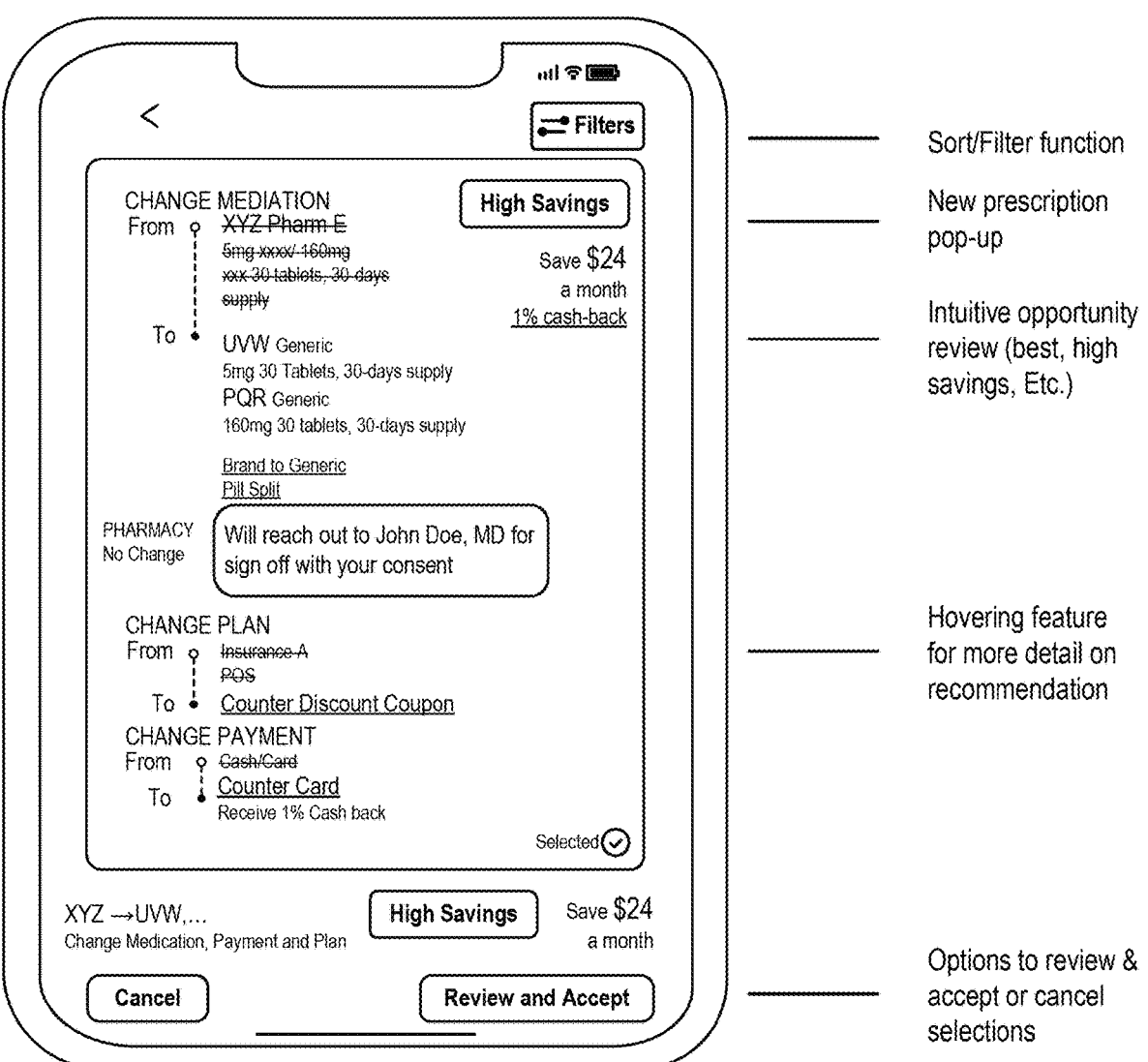
FIG. 6A depicts a screenshot of a messaging interface to present alternative claims on a client in the system for messaging information, in accordance with an illustrative embodiment.
Figure 6B:
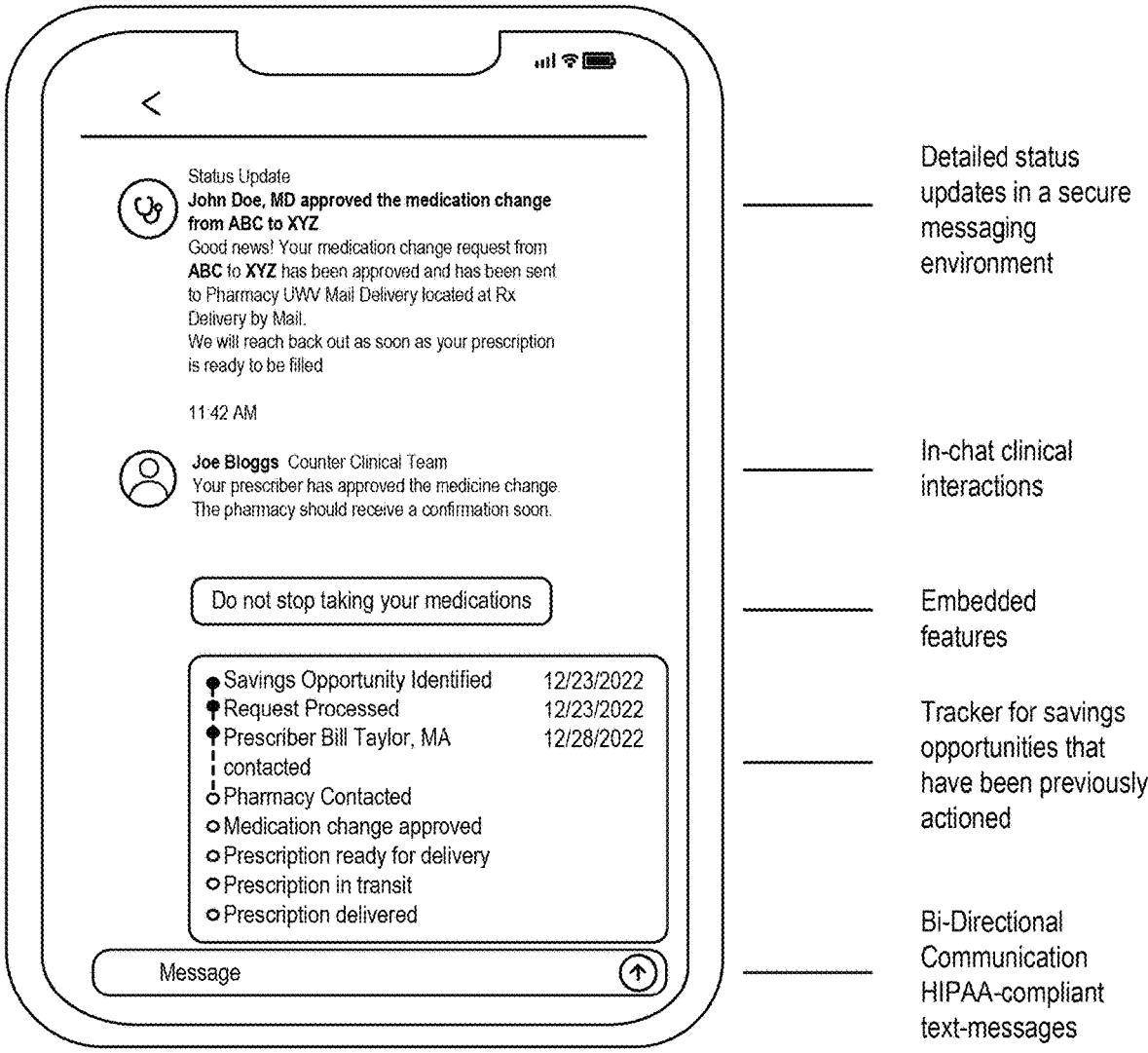
FIG. 6B depicts a screenshot of a messaging interface to present a chat session on a client in the system for messaging information, in accordance with an illustrative embodiment.

FIG. 6A depicts a screenshot of a messaging interface 600 to present alternative claims on a client in the system 500 for messaging information. As depicted, the messaging interface 600 may provide a sort or filter function, a new prescription pop-up element, an overview of the claim, an element to access additional information, and an option to accept or reject the selections. FIG. 6B depicts a screenshot of a messaging interface 650 to present a chat session on a client in the system 500 for messaging information. As depicted, the messaging interface 650 may provide a detailed status update (e.g., from the care provider) and a chat interactivity between the patient and the pharmacy. The messaging interface 650 may also provide for tracking of savings opportunities and bi-direction communication with other entities.

Figure 7:
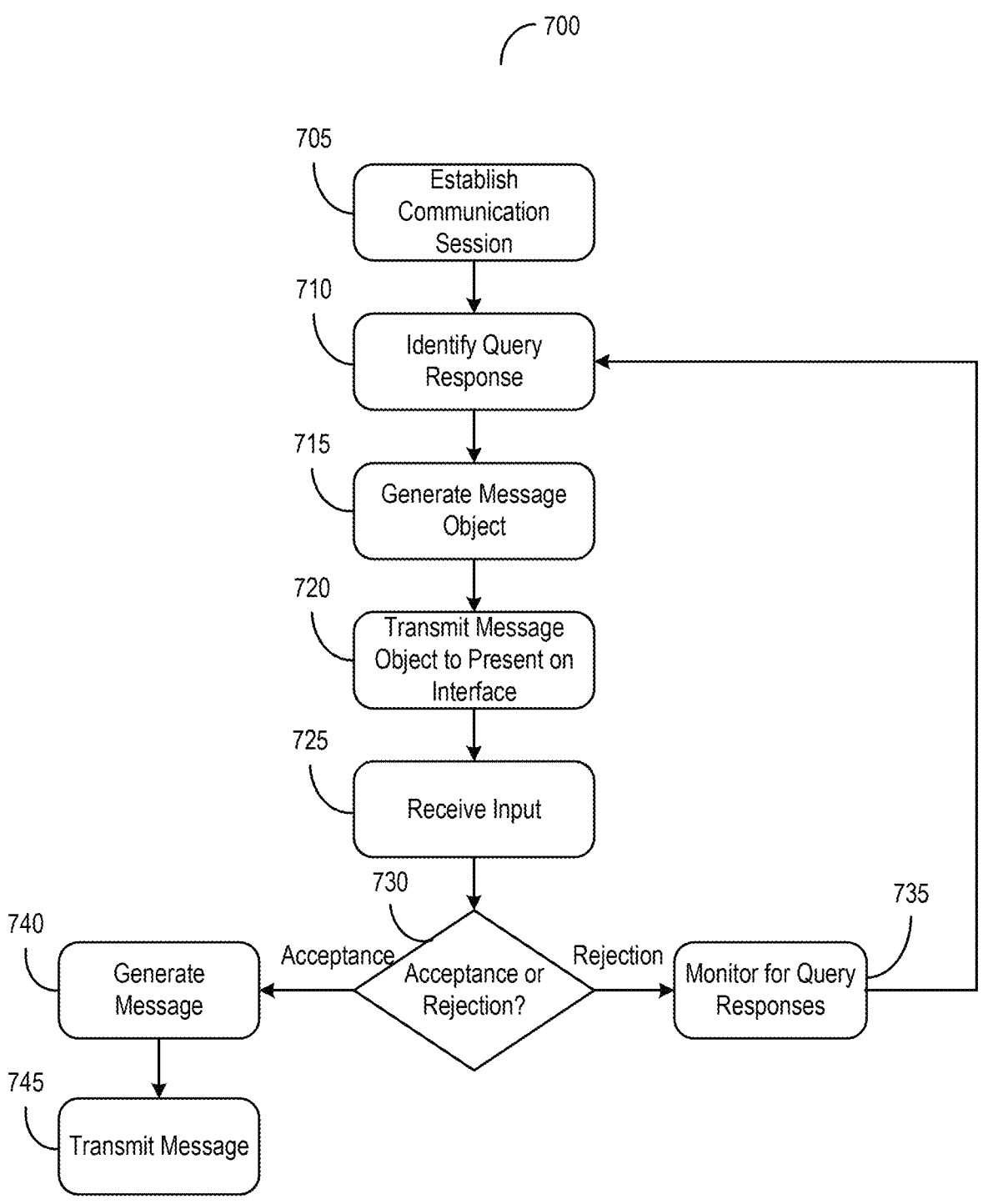
FIG. 7 depicts a block diagram of a method of messaging information for querying claims databases, in accordance with an illustrative embodiment.

FIG. 7 depicts a block diagram of a method 700 of messaging information for querying claims databases. The method 700 may be implemented or performed using any of the components detailed herein. Embodiments may include additional, fewer, or different operations from those described in the method 700. The method 700 may be performed by a server executing machine-readable software code, though it should be appreciated that the various operations may be performed by one or more computing devices and/or processors. Under the method 700, at step 705, a service may establish a communication session. At step 710, the service may identify a query response. At step 715, the service may generate a message object. At step 720, the service may transmit the message object to present via an interface. At step 725, the service may receive an input via the interface. At step 730, the service may determine whether acceptance or rejection of a claim in the query response. At step 735, if the input indicates rejection, the service may monitor for query responses and may repeat the functionality from step 710. At step 740, the service may generate a message to provide to a care provider service. At step 745, the service may transmit the message to the care provider service.

Figure 8:
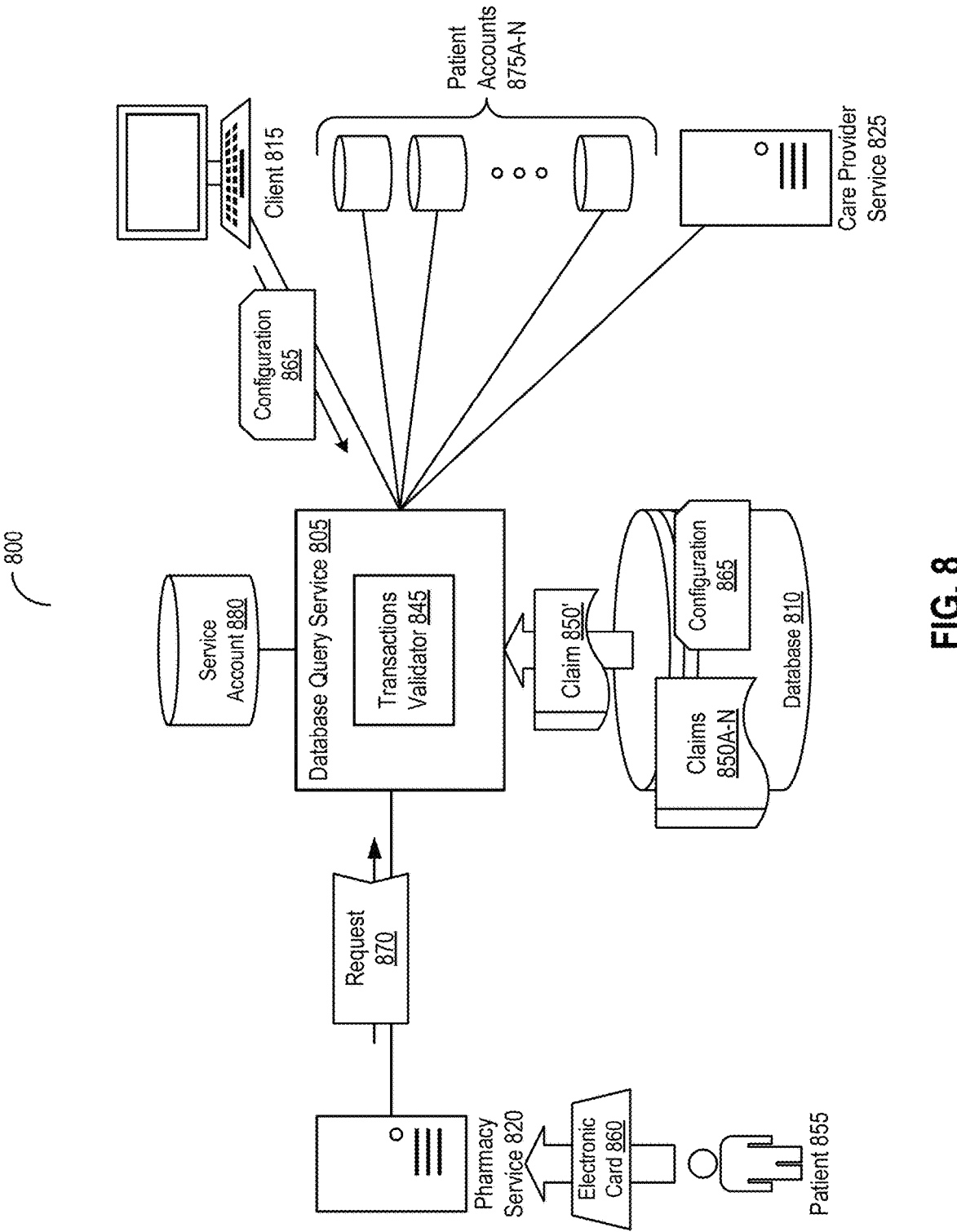
FIG. 8 depicts a block diagram of a system for applying configurations for electronic cards, in accordance with an illustrative embodiment.

FIG. 8 depicts a block diagram of a system 800 for linking data sources. In overview, the system 800 may include at least one database query service 805 including at least one transactions validator 845, at least one database 810 storing a set of claims 850A-N (hereinafter generally referred to as claims 850), at least one client 815, at least one pharmacy service 820, and at least one care provider 825, among others. Embodiments may comprise additional or alternative components or omit certain components from those of FIG. 8 and still fall within the scope of this disclosure. Various hardware and software components of one or more public or private networks may interconnect the various components of the system 800. Each component in system 800 (such as the database query service 805, the database 810, the client 815, the pharmacy service 820, and the care provider service 825) may be any computing device comprising one or more processors coupled with memory and software, and capable of performing the various processes and tasks described herein.

The transactions validator 845 executing on the database query service 805 retrieves, identifies, or otherwise receives at least one configuration 865 from the client 815 associated with the patient 855. The database query service 805 may be of a benefits optimization computing network handling claims and processing transactions associated with the prescriptions for patients. In some embodiments, the transactions validator 845 may receive the configuration 865 from a computer device of another entity on behalf of the patient 855. The configuration 865 may specify, identify, or otherwise define at least one rule for selecting one or more patient accounts 875A-N (hereinafter generally referred to as patient accounts 875) to which to apply values of claims 850. Each patient account 875 may be a financial account maintained by a financial institution (e.g., a bank or brokerage) on behalf of the patient 855 and may identify a balance value against which a value of the claims 850 are to be applied (e.g., added or deducted). The patient accounts 875 may include, for example, a checking account, a savings account, a flexible spending account (FSA), a health savings account (HSA), a medical savings account (MSA), an employer's health reimbursement arrangement (HRA) account, or a prescription discount card, among others.

Upon receipt, the transactions validator 845 may process or parse the configuration 865 to extract or identify the rule. The rule of the configuration 865 may define a sequence of patient accounts 875 to which to apply the values of the claims 850. The rule may also define a respective maximum amount for each patient account 875 that can be applied to the values of the claims 850. The rule of the configuration 865 may identify which of the patient accounts 875 to apply the values of the claims 850. With the identification, the transactions validator 845 may store the configuration 865 (or the rule) on the database 810. In some embodiments, the transactions validator 845 may store and maintain an association between the configuration 865 and at least one user account of the patient 855 on the database 810. The account may identify one or more patient accounts 875 associated with the patient 855.

In conjunction, the transactions validator 845 retrieves, receives, or identifies a response to a query to switch from a claim 850 originally assigned to the patient 855 to at least one alternate claim 850'. In some embodiments, the transactions validator 845 may listen, wait, or otherwise monitor for the response to the query to switch the claims. The query may be from the patient 855 or another entity, such as the care provider or the insurer associated with the patient 855. Upon identification, the transactions validator 845 may parse the alternate claim 850' to extract or identify: the prescription available to be taken by the patient 855, a value associated with receipt of the prescription, and the pharmacy service 820 through which the prescription is to be provided, among others. Separately, the alternate claim 850' may be used to generate and issue at least one electronic card 860 for the patient 855 to obtain the specified prescription at the value through a designated pharmacy service 820. The electronic card 860 may be associated with the benefits optimization platform and may be linked with the patient accounts 875 associated with the patient 855. The electronics card 860 may be issued by the benefits optimization platform to perform the transaction for the claims (e.g., the claim 850') assigned to the patient 855.

In addition, the transactions validator 845 listens, waits, or otherwise monitors for a use of the electronic card 860 through the pharmacy service 820 (e.g., at a physical storefront or an online merchandise portal). The electronic card 860 may be a physical or virtual card associated with the patient 855 and may include information transacting for obtaining the specified prescription at the value through a designated pharmacy service 820 in accordance with the claim 850'. The transactions validator 845 may monitor for the use of the electronic card 860 via a point-of-sale (PoS) device (e.g., a counter register device, a table PoS system, a card and chip reader, or a touch screen PoS device) associated with the pharmacy service 820. For example, the transaction monitor 845 may be in communication with the PoS device located in the physical storefront for the pharmacy service 820 to listen for events, such as the scanning of the electronic card 860.

In monitoring, the transactions validator 845 may retrieve, receive, or otherwise identify an indication of a request 870 for transaction at the pharmacy service 820. As the electronic card 860 may identify the database query service 805, the request 870 may be routed from the pharmacy service 820 to the database query service 805. The request 870 may include transactions data indicating a transaction to receive the prescription by the patient 855 using the electronics card 860 from the pharmacy service 820. The transactions data of the request 870 identify the value to be applied as identified by the claim 850' and by extension the electronic card 860. In some embodiments, the transactions validator 845 may receive the request 870 from the PoS device associated with the pharmacy service 820. When the request 870 is received, the transaction process 845 may detect or identify the request as the use of the electronic card 860.

Upon detection of the use, the transactions validator 845 may validate the use of the electronic card 860 at the pharmacy service 820. To validate, the transactions validator 845 may identify or select the claim 850' assigned to the patient 855. From the claim 850', the transactions validator 845 may identify the pharmacy service 820 through which the prescription is to be received. With the identification, the transactions validator 845 may determine whether the pharmacy service 820 at which the use is detected corresponds (e.g., matches) the pharmacy service 820 identified in the claim 850'. When the pharmacy services 820 differ, the transactions validator 845 may determine that the use of the electronic card 860 is invalid. The transactions validator 845 may transmit an indication of invalid use to the client 815 associated with the patient 855 or the pharmacy service 820 at which the use is detected. In addition, the transaction processor 845 may refrain from withdrawing from any of the patients accounts 875 linked to the electronic card 860. On the other hand, when the pharmacy services 820 correspond, the transactions validator 845 may determine that the use of the electronic card 860 is valid. The transaction processor 845 may determine to apply the value to any of the patients' accounts 875 and may continue processing the transaction request.

With the validation, the transactions validator 845 select or identify a user account of the patient 855 defining the configuration 865. From the account, the transaction validator 845 may select or identify one or more patient accounts 875 associated with the patient 855 to which to apply the value. From the overall set of patient accounts 875, the transactions validator 845 may select a subset of patient accounts 875 in accordance with the rule of the configuration 865. For example, the transactions validator 845 may select the checking account and the FSA account associated with the patient 855 from the overall set of patient accounts 875. In some embodiments, the transactions validator 845 may identify the rule of the configuration 865 based on the information associated with the electronic card 860. Using the identified rule, the transactions validator 845 may select one or more from the overall set of patient accounts 875.

Upon selection, the transactions validator 845 may calculate, generate, or otherwise determine a respective value to apply for each of the one or more patient accounts 875. The determination of the value to apply may be in accordance with the rule defined in the configuration 865. For instance, the transaction processor 845 may determine the value from the savings account up to the specified maximum and then withdraw the remaining value from the HSA associated with the patient 855. Using the determined value, the transactions validator 845 applies the value across the selected patient accounts 875. To apply, the transactions validator 845 may provide, send, or otherwise transmit a request to transfer the determined transaction value to a respective transactions processor associated with each of the patient accounts 875. The request may identify the value to be subtracted, deducted, or otherwise withdrawn from the one or more patient accounts 875 according to the rule.

In some embodiments, the transaction processor 845 may apply the value to at least one service account 880 associated with the database query service 805, while waiting acknowledgment (e.g., of withdrawal or transfer) from the transaction processor associated with the patient accounts 875. The service account 880 may be a financial account maintained by a financial institution (e.g., a bank or brokerage) on behalf of the entity associated with the database query service 805. The value may be applied (e.g., withdrawn or deducted) to the service account 880 for a defined period of time (e.g., 1 day to 2 weeks), while waiting for the confirmation of transfer from the patient accounts 875. Upon receipt of the acknowledgement, the transaction processor 845 may apply a reimbursement value (e.g., by adding or depositing) to the service account 880.

With the application, the transactions validator 845 calculates, generates, or otherwise determines a difference value based on the value identified in the originally assigned claim 850 and the value identified in the alternate claim 850'. The difference value may represent an amount in savings arising from switching from the original claim 850 to the alternate claim 850'. The transactions validator 845 may determine the difference value, in response to application of the value across the one or more accounts 875 upon detection of the use of the electronic card 860. Upon determination, the transactions validator 845 may store the difference value on the database 810 for use in subsequent applications of values in other claims 850 of the patient 855. In some embodiments, the transactions validator 845 may update the account associated with the patient 855 with the indication of the difference value to apply for subsequent claims across the patient accounts 875. The transactions validator 845 may also transmit, provide, or send an indication of the difference value to the client 815 associated with the patient 855. The presentation of the indication may increase the likelihood that the patient 855 associated with the client 815 will accept future switches of claims 850.

The transactions validator 845 transmits, provides, or sends one or more messages in connection with the application of the value to various entities, such as the client 815 associated with the patient 855, the pharmacy service 820, and the care provider service 825, among others. In some embodiments, the transactions validator 845 may provide, send, or transmit a message to present an indication of the application of the value across the one or more selected patient accounts 875. The message may be presented via an interface of the client 815, and may be, for example, a notification that the value has been successfully withdrawn from the identified patient accounts 875.

Figure 9:
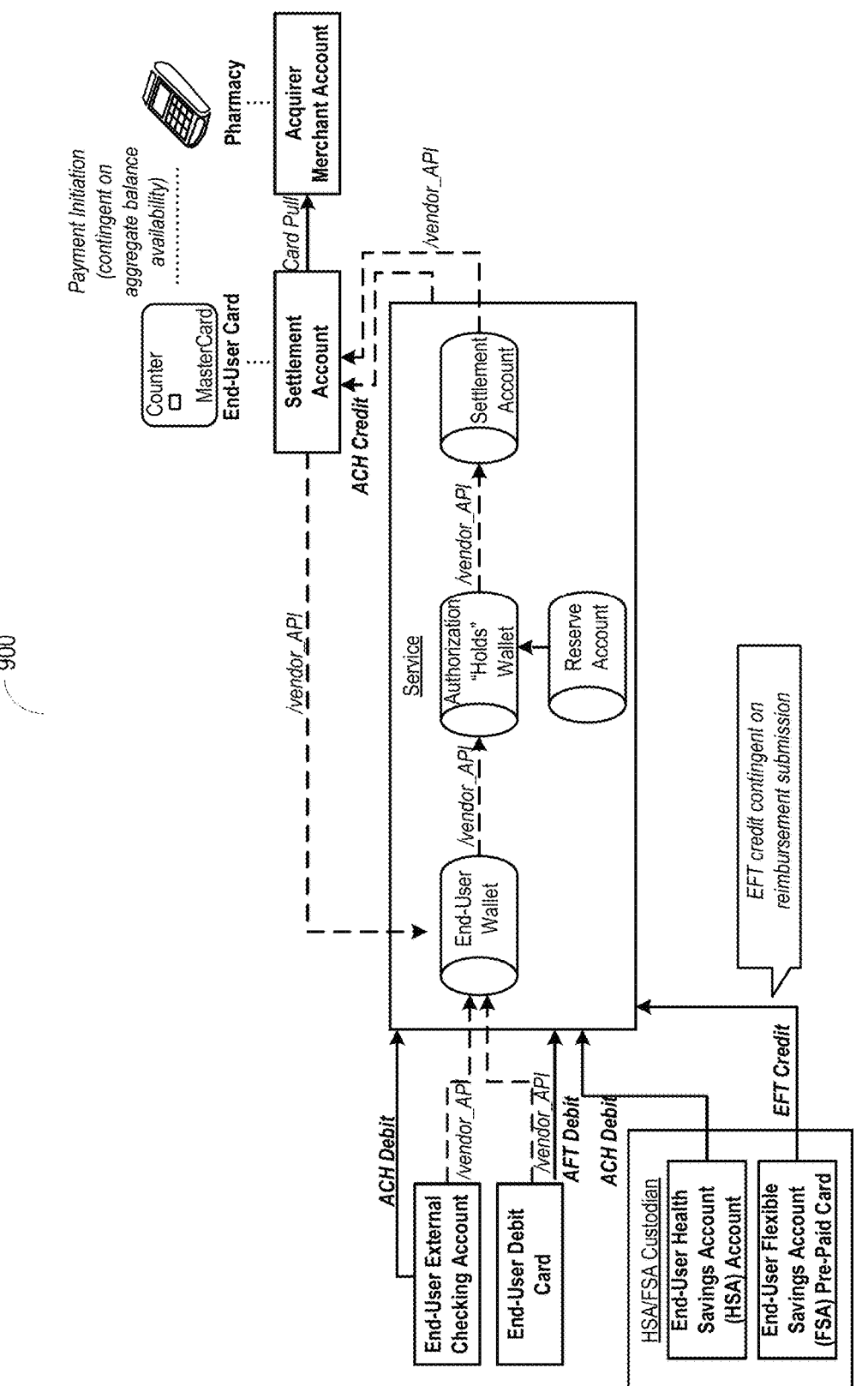
FIG. 9 depicts a block diagram of an architecture for processing transactions using electronic cards, in accordance with an illustrative embodiment.

FIG. 9 depicts a block diagram of an architecture 900 for processing transactions using electronic cards. In the architecture 900, the service may detect the use of an end-user card at a pharmacy to obtain a prescription in accordance with a claim assigned to the patient. When used the pharmacy, a point-of-sale (POS) device may transfer the value identified in the end-user card from a settlement account associated with the service to a merchant account. The settlement account may perform an application programming interface (API) call with the service to access related accounts. Upon detection, the service may use one or more API calls to transfer values from accounts associated with a patient, such as an external checking account, a debit card, a health savings account (HSA), or a flexible savings account (FSA), among others. The transfer may be in accordance with various electronic funds transfer (EFT) protocols, such as an automated clearing house (ACH) or automated funds transfer (AFT), among others. The service may pull the values from the accounts to transfer to an end-user wallet account, and in turn to an authorization wallet. The service may use balance on a reserve account to apply (e.g., add) to the authorization wallet. The service may transfer the value from the authorization wallet to the settlement account, and in turn apply the value to the settlement account for the end-user card.

Figure 10:
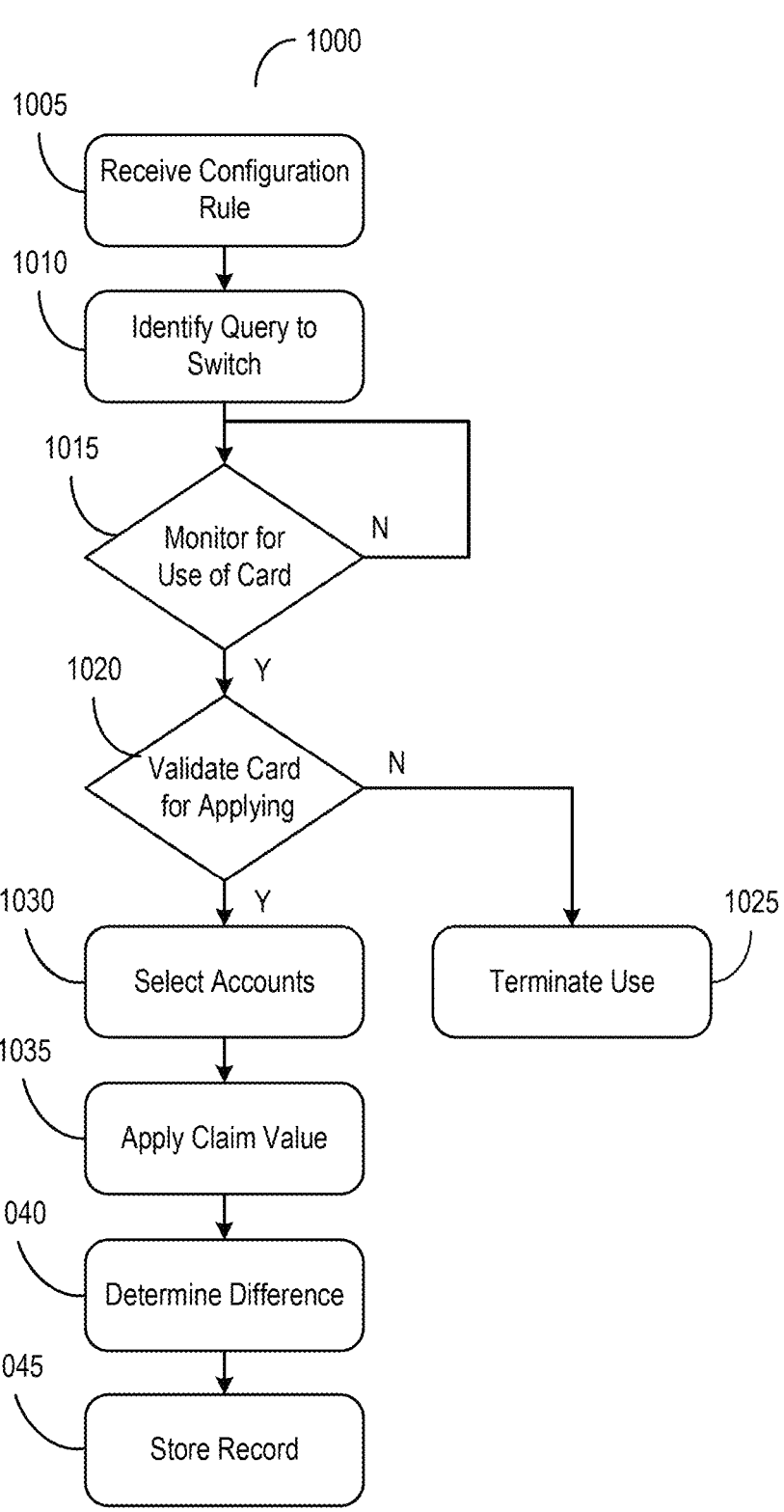
FIG. 10 depicts a flow diagram of a method of applying configurations for electronic cards, in accordance with an illustrative embodiment.

FIG. 10 depicts a flow diagram of a method 1000 of applying configurations for electronic cards. The method 1000 may be implemented or performed using any of the components detailed herein. Embodiments may include additional, fewer, or different operations from those described in the method 1000. The method 1000 may be performed by a server executing machine-readable software code, though it should be appreciated that the various operations may be performed by one or more computing devices and/or processors. Under the method 1000, at step 1005, a service may receive a configuration rule. At step 1010, the service may identify a query to switch. At step 1015, the service may monitor for a use of an electronic card. At step 1020, when the use is detected, the service may determine whether the card is validated for application. At step 1025, if validation is not successful, the service may terminate the transaction. Otherwise, at step 1030, if the validation is successful, the service may select accounts. At step 1035, the service may apply claim value. At step 1040, the service may determine a different. At step 1045, the service may store a record.

The foregoing method descriptions are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the process flow diagrams are provided merely as illustrative examples and are not intended to require or imply that the operations of the various embodiments must be performed in the order presented. The operations in the foregoing embodiments may be performed in any order. Words such as "then," "next," etc. are not intended to limit the order of the operations; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The operations of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method of linking data sources, comprising:
receiving, by a server of an optimization computing network, from a first service, operation data indicating an operation to receive an instruction by a user at a value using an electronic device associated with the optimization computing network;
selecting, by the server, from a plurality of records on a database, a record assigned to the user using the operation data, the record indicating a second service through which the instruction is received;
validating, by the server, that the operation is occurring at the first service corresponding to a second service identified in the record;
identifying, by the server, responsive to validating, a user account of the user defining a rule for applying transaction values to one or more accounts linked with the electronic device;
in response to identification of the user account, determining, by the server, for each of the one or more accounts in accordance with the rule, a respective transaction value operable to receive the instruction via transmission of a request to an operation processor for a corresponding account linked with the electronic device; and
transmitting, by the server, to an operation processor associated with each of the one or more accounts, the request to perform the operation by transferring the respective transaction value from the corresponding account.

2. The method of claim 1, further comprising:
determining, by the server, a difference value based upon (i) the transaction value identified in the record and (ii) the transaction value identified in a second record previously assigned to the user; and
updating, by the server, on the database, a user account associated with the user with an indication of the different value to apply for subsequent records of the user across the one or more accounts.

3. The method of claim 2, further comprising transmitting, by the server, to a client associated with the user, the difference value for presentation via the client.

4. The method of claim 1, further comprising determining, by the server, to refrain from withdrawing from the one or more account linked to the electronic device of the user, responsive to failure to validate.

5. The method of claim 1, wherein the rule defined in the user account identifies at least one of (i) a sequence in which to withdraw one or more transaction values from the one or more accounts linked to the electronic device or (ii) a maximum value at which to withdraw from each of the one or more accounts.

6. The method of claim 1, wherein the electronic device is issued by the optimization computing network to perform the operation for the record assigned to the user.

7. The method of claim 1, wherein receiving the operation data further comprises receiving, from an end-provider device associated with the service, the operation data including an identification of the service.

8. A system for linking data sources, comprising:
at least one server of an optimization computing network having one or more processors coupled with memory, configured to:
receive, from a first service, operation data indicating an operation to receive an instruction by a user at a value using an electronic device associated with the optimization computing network;
select, from a plurality of records on a database, a record assigned to the user using the operation data, the record indicating a second service through which the instruction is received;
validate that the operation is occurring at the first service corresponding to a second service identified in the record;
identify, responsive to validating, a user account of the user defining a rule for applying transaction values to one or more accounts linked with the electronic device;
in response to identification of the user account, determine, for each of the one or more accounts in accordance with the rule, a respective transaction value operable to receive the instruction via transmission of a request to an operation processor for a corresponding account linked with the electronic device; and
transmit, to an operation s processor associated with each of the one or more accounts, the request to perform the operation by transferring the respective transaction value from the corresponding account.

9. The system of claim 8, wherein the at least one server is further configured to:

determine a difference value based upon (i) the transaction value identified in the record and (ii) the transaction value identified in a second record previously assigned to the user; and update, on the database, a user account associated with the user with an indication of the different value to apply for subsequent records of the user across the one or more accounts.

10. The system of claim 9, wherein the at least one server is further configured to transmit, to a client associated with the user, the difference value for presentation via the client.

11. The system of claim 8, wherein the at least one server is further configured to determine to refrain from withdrawing from the one or more account linked to the electronic device of the user, responsive to failure to validate.

12. The system of claim 8, wherein the rule defined in the user account identifies at least one of (i) a sequence in which to withdraw one or more transaction values from the one or more accounts linked to the electronic device or (ii) a maximum value at which to withdraw from each of the one or more accounts.

13. The system of claim 8, wherein the electronic device is issued by the optimization computing network to perform the operation for the record assigned to the user.

14. The system of claim 8, wherein the at least one server is further configured to receive, from an end-provider device associated with the service, the operation data including an identification of the service.

15. A non-transitory computer readable medium storing instructions, which when executed by at least one processor, cause the at least one processor to:

receive, from a first service, operation data indicating an operation to receive an instruction by a user at a value using an electronic device associated with an optimization computing network;

select, from a plurality of records on a database, a record assigned to the user using the operation data, the record indicating a second service through which the instruction is received;

validate that the operation is occurring at the first service corresponding to a second service identified in the record;

identify, responsive to validating, a user account of the user defining a rule for applying transaction values to one or more accounts linked with the electronic device;

in response to identification of the user account, determine, for each of the one or more accounts in accordance with the rule, a respective transaction value operable to receive the instruction via transmission of a request to an operation processor for a corresponding account linked with the electronic device; and transmit, to an operation processor associated with each of the one or more accounts, a request to perform the operation by transferring the respective transaction value from a corresponding account.

16. The non-transitory computer readable medium of claim 15, wherein the instructions further cause the at least processor to:

determine a difference value based upon (i) the transaction value identified in the record and (ii) the transaction value identified in a second record previously assigned to the user; and update, on the database, a user account associated with the user with an indication of the different value to apply for subsequent records of the user across the one or more accounts.

17. The non-transitory computer readable medium of claim 16, wherein the instructions further cause the at least processor to transmit, to a client associated with the user, the difference value for presentation via the client.

18. The non-transitory computer readable medium of claim 15, wherein the instructions further cause the at least processor to determine to refrain from withdrawing from the one or more account linked to the electronic device of the user, responsive to failure to validate.

19. The non-transitory computer readable medium of claim 15, wherein the rule defined in the user account identifies at least one of (i) a sequence in which to withdraw one or more transaction values from the one or more accounts linked to the electronic device or (ii) a maximum value at which to withdraw from each of the one or more accounts.

20. The non-transitory computer readable medium of claim 15, wherein the instructions further cause the at least processor to receive, from an end-provider device associated with the service, the operation data including an identification of the service.

* * * * *